US011953579B2

(12) United States Patent
Jeannin et al.

(10) Patent No.: US 11,953,579 B2
(45) Date of Patent: Apr. 9, 2024

(54) BI-STATIC OR MULTI-STATIC RADAR SYSTEM FOR AERIAL SURVEILLANCE WITH SPATIAL ILLUMINATION

(71) Applicant: AIRBUS DEFENCE AND SPACE SAS, Toulouse (FR)

(72) Inventors: Nicolas Jeannin, Toulouse (FR); Frédéric Voulouzan, Toulouse (FR); Philippe Bertheux, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 0 days.

(21) Appl. No.: 18/025,600

(22) PCT Filed: Sep. 7, 2021

(86) PCT No.: PCT/EP2021/074553
§ 371 (c)(1),
(2) Date: Mar. 30, 2023

(87) PCT Pub. No.: WO2022/053452
PCT Pub. Date: Mar. 17, 2022

(65) Prior Publication Data
US 2023/0324532 A1     Oct. 12, 2023

(30) Foreign Application Priority Data

Sep. 10, 2020   (FR) .................................. 2009148

(51) Int. Cl.
*G01S 13/00*   (2006.01)
*G01S 13/02*   (2006.01)
(Continued)

(52) U.S. Cl.
CPC .......... *G01S 13/003* (2013.01); *G01S 13/582* (2013.01); *G01S 13/91* (2013.01); *G01S 2013/0245* (2013.01)

(58) Field of Classification Search
CPC ...... G01S 13/003; G01S 13/933; G01S 7/003; G01S 7/006; G01S 13/904; G01S 11/02;
(Continued)

(56) References Cited

U.S. PATENT DOCUMENTS 4,843,397 A * 6/1989 Galati ....................... B64G 3/00
                                                             342/368
H1383 H  * 12/1994 Kaplan ..................... H01Q 3/26
                                                             342/372
(Continued)

FOREIGN PATENT DOCUMENTS

WO     2019/073230     4/2019

OTHER PUBLICATIONS

Jose Luis Bueso Bello, et al., "Characteristics of Tandem-X Experimental Modes", 2012 IEEE International Geoscience and Remote Sensing Symposium (IGARSS), IEEE, Jul. 22, 2012, pp. 1042-1045 (4 pages).

(Continued)

*Primary Examiner* — Olumide Ajibade Akonai
(74) *Attorney, Agent, or Firm* — Nixon & Vanderhye P.C.

(57) ABSTRACT

A transmitter device of a bi-static or multi-static radar system is disclosed and implemented for aerial surveillance. The transmitter device is intended to be on board a satellite orbiting the Earth. Once in orbit, the transmitter device is configured to obtain information relating to a region of interest monitored by at least one receiver device of the radar system, and to transmit a signal in a radio beam illuminating at least one portion of the region of interest.

18 Claims, 11 Drawing Sheets

Figure 1:
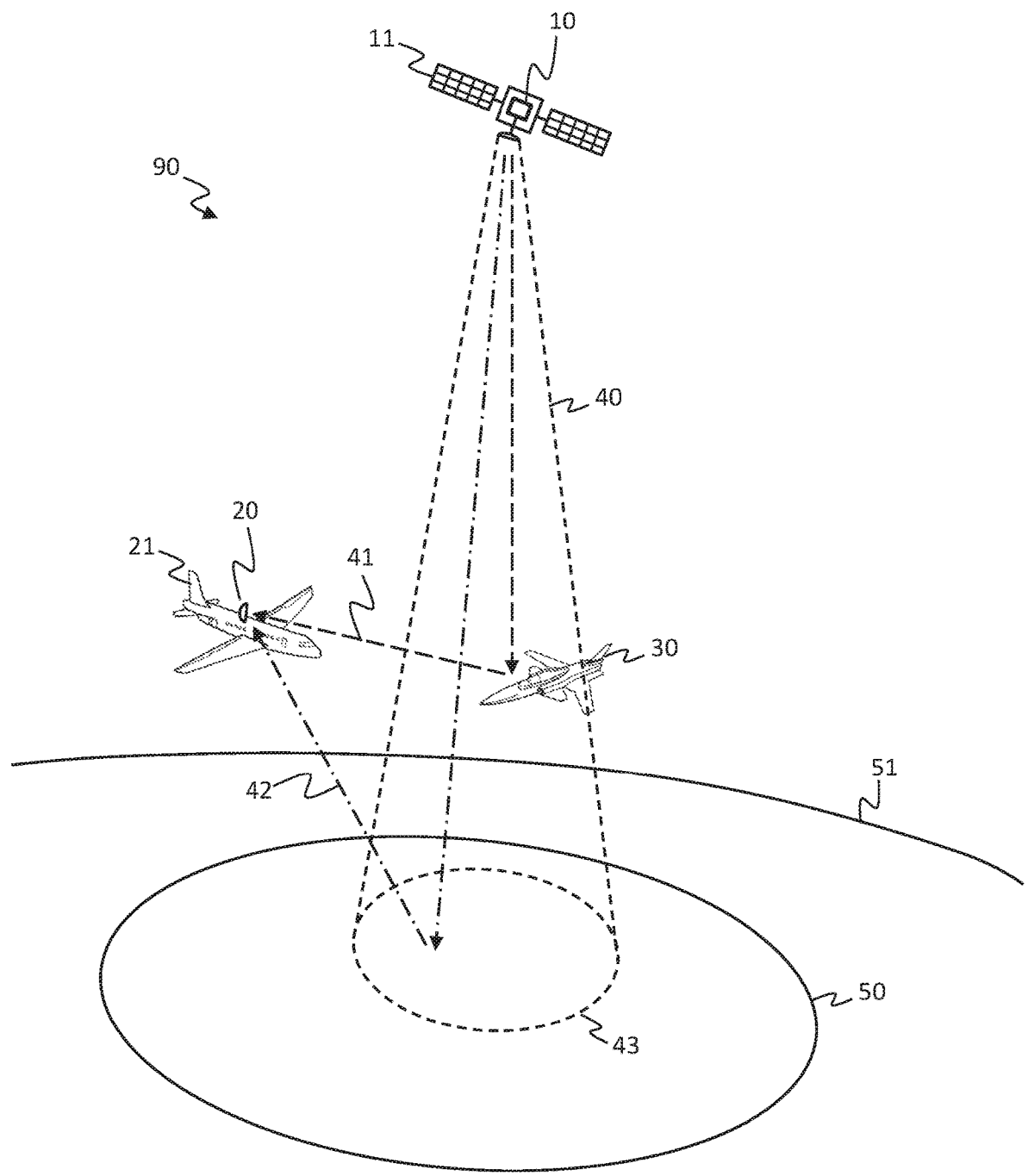

(51) Int. Cl.
*G01S 13/58* (2006.01)
*G01S 13/91* (2006.01)

(58) Field of Classification Search
CPC .... G01S 13/66; G01S 13/9058; G01S 17/003; G01S 19/18; G01S 13/781
See application file for complete search history.

(56) References Cited

U.S. PATENT DOCUMENTS

| | | | | |
|---|---|---|---|---|
| 7,619,554 | B2* | 11/2009 | Shklarsky | G01S 13/003 342/191 |
| 2010/0039313 | A1* | 2/2010 | Morris | G01S 13/28 342/25 R |
| 2014/0009322 | A1* | 1/2014 | Suberviola | G01S 11/02 342/109 |
| 2014/0160458 | A1* | 6/2014 | Halmos | G01S 7/4816 356/4.01 |
| 2016/0178729 | A1* | 6/2016 | Dolgin | G01S 13/48 342/147 |
| 2020/0150214 | A1* | 5/2020 | Neufeldt | G01S 13/878 |

OTHER PUBLICATIONS

Gerhard Krieger, et al., "TanDEM-X: A Satellite Formation for High-Resolution SAR Interferometry", IEEE Transactions on Geoscience and Remote Sensing, IEEE Service Center, vol. 45, No. 11, Nov. 1, 2007, pp. 3317-3341 (25 pages).
International Search Report and Written Opinion of the ISA for PCT/EP2021/074553 dated Dec. 20, 2021, (13 pages).

\* cited by examiner

BI-STATIC OR MULTI-STATIC RADAR SYSTEM FOR AERIAL SURVEILLANCE WITH SPATIAL ILLUMINATION

CROSS REFERENCE TO RELATED APPLICATIONS

The present application is a National Phase of International Application Number PCT/EP2021/074553 filed Sep. 7, 2021, which designated the U.S. and claims priority benefits from French Application Number FR 2009148 filed Sep. 10, 2020, the entire contents of each of which are hereby incorporated by reference.

FIELD OF INVENTION

The present invention belongs to the field of airspace surveillance. In particular, the invention relates to a bi-static or multi-static radar system for aerial surveillance whose transmitter(s) is/are on board satellites orbiting the Earth.

PRIOR ART

There are different radar systems for airspace surveillance.

For example, there are mono-static radar systems located on the ground which transmit radio pulses and detect the return of a pulse after reflection on a target. The time difference between transmission and reception determines the distance of the target from the antenna and the position of the antenna when receiving the echo determines the azimuth of the target.

There are also bi-static radar systems, for which the transmitter and the receiver are separate, and multi-static radar systems comprising several transmitters and/or several receivers distinct from each other.

However, the coverage offered by a bi-static or multi-static radar system located on the ground remains limited.

The use of an illuminator of opportunity from the space (for example a telecommunication or navigation satellite) as a transmitter of a passive bi-static radar system has also been studied. Nonetheless, the use of such an illuminator of opportunity has serious limitations in terms of detection range and/or availability of signals on the terrestrial globe scale given the constraints of coverage and signal power specific to these applications.

Patent application WO 2019/073230 A1 discloses such a passive bi-static radar system with an illuminator of opportunity from space.

DISCLOSURE OF THE INVENTION

The present invention aims to overcome all or part of the drawbacks of the prior art, in particular those set out hereinbefore, by providing a solution based on a bi-static or multi-static radar whose transmitters cooperate with the receivers to implement different operating modes allowing optimising the coverage, the detection range as well as the possibility of preventing an unauthorised use of the signal transmitted by the transmitters.

To this end, and according to a first aspect, the present invention provides a transmitter device for a bi-static or multi-static radar system for aerial surveillance. The transmitter device is intended to be on board a satellite orbiting the Earth. When the transmitter device is on board the satellite in orbit, the transmitter device is configured to obtain information relating to a region of interest intended to be monitored by at least one receiver device of the radar system and to transmit a signal in a radio beam illuminating at least one portion of said region of interest.

By "bi-static radar system", it should be understood a radar whose transmitter and receiver are separate, in contrast with a mono-static radar for which the transmitter and the receiver are co-located. By "multi-static radar system", it should be understood a radar system which comprises at least three separate components for monitoring a common space, for example one transmitter and two receivers, or two transmitters and one receiver, or several transmitters and several receivers.

By "air surveillance", it should be understood in particular that a target of the radar system is an aircraft (airplane, helicopter, drone, aerostat, etc.) evolving in an airspace below an altitude of 20 kilometres.

The radar operates in the radio-frequency domain, i.e. for signals whose electromagnetic wave frequency varies between 3 kHz (kiloHertz) and 300 GHz (gigaHertz).

For example, the "region of interest" is a geographical region on the Earth's surface. The radio beam is then oriented such that the footprint of the beam covers at least one portion of the region of interest.

According to another example, the region of interest may be a volume in which it is desired to detect and geolocate a target. The radio beam is then oriented such that the intersection of the beam with the region of interest is non-zero.

By the formula "a region of interest monitored by a receiver device of the radar system", it should be understood that the receiver device is capable of receiving a radio signal transmitted by the transmitter device and reflected by a target located in the beam carrying the signal radio.

By "radio beam", it should be understood an illumination cone in which the energy of the transmitted signal is primarily focused. For example, the radio beam corresponds to the illumination cone corresponding to a −3 dB angular aperture for the antenna of the transmitter device (the radio beam is then defined as the angular region, around the axis of a main lobe of an emission diagram for the transmitted signal, in which the radiated energy is higher than half the energy radiated in the axis of the main lobe). However, other conventions could be used to define a radio beam.

A receiver device of the bi-static or multi-static radar system may be carried on different types of platforms: aircraft, satellite, land or sea vehicle, etc.

The invention is based on coordination between the transmitter devices and the receiver devices of the radar system. Indeed, a transmitter device must transmit a radio signal in a particular direction defined according to the region of interest monitored by the receiver device(s) of the radar system. Hence, it consists of an "ad hoc" transmitter device for the radar system, meaning that the transmitter device is especially configured to focus the energy of the radio signal towards a region of interest that one wishes to monitor. Hence, this excludes transmitters of opportunity such as, for example, a telecommunication satellite whose signals would be used opportunistically for surveillance with a passive radar system. Indeed, unlike the object of the invention, the signals transmitted by a telecommunication satellite are transported in beams oriented to illuminate predetermined regions in order to provide them with telecommunications services, and these beams are not intentionally oriented towards regions for which radar surveillance is desired. In other words, the radio beams generated by a telecommunication satellite are oriented to address a telecommunication mission, and not to an aerial surveillance mission, which leads to a dilution of the power flow on the ground and therefore to a less usefulness for target detection.

Hence, the transmitter device must receive information relating to the region of interest in order to orient a radio beam such that it at least partially illuminates the region of interest. This information may correspond to geographical coordinates of the region of interest, to a direction that a beam must follow to illuminate the region of interest, or else to configuration parameters of an antenna system of the transmitter device to produce a beam which illuminates the region of interest. The receiver device(s) of the radar system must also know the illuminated region of interest.

The invention has the advantages inherent to the bi-static or multi-static nature of the radar, namely in particular the possibility of detecting objects whose geometry limits returns in a mono-static configuration.

The invention also allows having a guaranteed surveillance capacity at any point on the globe without having to deploy transmitters located on the ground or in the atmosphere.

The invention also allows detecting targets evolving at very low altitude, which is not generally the case for air surveillance radars located on the ground because of the absence of a direct line of sight between the target and the radar due to the curvature of the Earth.

The invention allows obtaining large detection ranges thanks to a capacity of focusing energy towards a particular region of interest.

The cooperation between the transmitter device and the receiver device also allows preventing the exploitation of the signals transmitted by the transmitter device by third parties.

In summary, the use of a transmitter device that operates in cooperation with a receiver device of a bi-static or multi-static radar system enables the implementation of different operating modes allowing optimising the flexibility of coverage, the detection range, as well as the possibility of preventing unauthorised use of the signal.

It should be noted that the coordination between a transmitter device and a receiver device of the radar system according to the invention allows ensuring the use of a common time and frequency base between these two entities (by this, it should be understood that the time of transmission of the signal and the frequency at which the signal is transmitted by the transmitter device are known a priori by the receiver device). However, this time and frequency synchronisation between a transmitter device and a receiver device is not always necessary, in particular in the case where the localisation of the target is based on a measurement of the difference in propagation time of the signal between several receiver devices.

In particular embodiments, the invention may also include one or more of the following features, considered separately or according to any technically-feasible combination.

In particular embodiments, the waveform of the transmitted signal is generated directly on board the satellite in a standalone manner.

In other words, it does not consist of a signal transmitted by a ground station and repeated by the transmitter device on board the satellite.

In particular embodiments, when a radio beam transmitted by the transmitter device cannot completely illuminate the region of interest, the transmitter device is configured to successively illuminate different sub-regions of the region of interest.

Such arrangements allow searching for a target with the device transmitter over a region of interest larger than the region covered by a radio beam generated by the transmitter device.

In particular embodiments, the transmitter device includes a phased array antenna and a beam-forming network configured to repoint a radio beam transmitted by the transmitter device according to different directions. The transmitter device may possibly further include a reflector intended to be illuminated by the phased array positioned proximate to the focal point of said reflector.

Indeed, a phased array antenna (electronic repointing) allows repointing a beam more quickly than an antenna with mechanical repointing. Hence, this confers a better responsiveness on the system. In particular, this may allow orienting the beam continuously in order to maintain the illumination of a region of interest the time during which the satellite flies over said region. This may also allow completely illuminating the region of interest quickly with a sequence of different beams.

In particular embodiments, the transmitted signal is a combination of a useful signal with a parasitic signal, said parasitic signal being decorrelated from the useful signal and having an ambiguity function with a main lobe with a width in the frequency domain greater than twice the maximum Doppler frequency shift likely to be observed for a target aimed at by the radar system.

Such arrangements allow quite significantly limiting the use by a third party of the transmitted signal. Only an authorised receiver device that knows the useful signal and/or the parasitic signal will then be able to detect and geolocate a target from the signal reflected by the target.

As a reminder, the ambiguity function (as studied by Woodward in "*Probability and Information Theory with Applications to Radar*"), is an essential tool of radar detection theory which characterises the properties of the signal as a measuring instrument. The ambiguity function of a complex signal can be defined as a distance between this signal and the same signal altered by the action of a time and frequency translation operator.

In particular embodiments, the parasitic signal is a "chirp" signal having a frequency varying linearly around a central frequency during a predetermined period with a random change in the central frequency from one period to another.

In particular embodiments, the bandwidth swept by the "chirp" signal during said predetermined period is larger than twice the maximum Doppler frequency shift likely to be observed for a target aimed at by the radar system.

Such arrangements allow ensuring that parasitic echoes returning from the ground will necessarily contaminate the signal reflected by the target. A receiver belonging to the radar system and knowing the useful signal or the parasitic signal will be capable of suppressing these parasitic echoes by appropriate signal processing. On the other hand, a receiver not belonging to the radar system and therefore knowing neither the useful signal nor the parasitic signal will not be able to suppress these parasitic echoes.

According to a second aspect, the present invention relates to a bi-static or multi-static radar system for aerial surveillance of a region of interest. The radar system comprises:
- at least one transmitter device according to one of the preceding embodiments, each transmitter device being configured (when the transmitter device is on board the satellite in orbit) to transmit a signal in a radio beam illuminating at least one portion of said region of interest, at least one receiver device intended to be positioned to monitor said region of interest.

The invention is based on cooperation between the transmitter devices and the receiver devices of the radar system. Indeed, a transmitter device transmits a radio signal in a particular direction defined according to the region of interest monitored by the receiver device(s) of the radar system.

In particular embodiments, the invention may also include one or more of the following features, considered separately or according to any technically-feasible combination.

In particular embodiments, the radar system is a multi-static radar system including several transmitter devices and/or several receiver devices.

The spatial diversity of a multi-static radar system allows improving the detection and geolocation capabilities of the system. In particular, the possibility of having different observation angles allows increasing the chances of observing the target under a geometry in which the radar cross-section (RCS) is significant, given the highly anisotropic nature of the targets of interest.

In particular embodiments, the radar system includes several transmitter devices, and the different transmitter devices are on board satellites organised into constellations so that for any region of interest on the Earth's surface, there is always a direct line of sight towards said region of interest for several ones of said satellites.

In particular embodiments, the transmitter device(s) and/or the receiver device(s) are further configured to communicate via a satellite telecommunication network to exchange data between two transmitter devices, between two receiver devices, between a device transmitter and a receiver device, between a control station on the ground and a transmitter device, or between a control station on the ground and a receiver device.

For this purpose, the transmitter device(s) and/or the receiver device(s) include(s) a communication module suited to establish communication links with the satellite telecommunication network. Such arrangements allow considering global coverage by the radar system. It should be noted that the satellite telecommunication network may be separate from the radar system according to the invention.

According to a third aspect, the present invention relates to a method for aerial surveillance using a bi-static or multi-static radar system. The radar system includes at least one transmitter device on board a satellite orbiting the Earth and at least one receiver device. The method includes the following steps:
- a determination of a region of interest in which it is desired to detect and geolocate an aircraft,
- a positioning of said receiver device to monitor said region of interest,
- a communication to the transmitter device of information relating to said region of interest,
- a transmission, by said transmitter device, of a signal in a radio beam illuminating at least one portion of said region of interest,
- an estimation of the position of the aircraft in the region of interest based on a signal received by the receiver device corresponding to the reflection on the aircraft of the signal transmitted by the transmitter device.

By "positioning the receiver device to monitor said region of interest", it should be understood that the receiver device is placed in the region of interest or close enough to the region of interest so that it could receive the signal transmitted by the transmitter device and reflected by a target located in the radio beam carrying said signal. Also, an antenna system of the receiver device is configured to receive this signal.

In particular embodiments, the invention may further include one or more of the following features, considered separately or according to any technically-feasible combination.

In particular embodiments, when a radio beam transmitted by a transmitter device cannot completely illuminate the region of interest, the method further includes the determination of an illumination sequence of different sub-regions of the region of interest for said transmitter device.

In particular embodiments, the transmission of the radio signal includes a combination of a parasitic signal with a useful signal, said parasitic signal being decorrelated from the useful signal and having an ambiguity function with a main lobe with a width in the frequency domain greater than twice the maximum Doppler frequency shift likely to be observed for a target aimed at by the radar system.

In particular embodiments, the radar system is a multi-static radar system including a number $N_E$ of transmitter devices and a number $N_R$ of receiver devices, where $N_E$ and $N_R$ are positive natural integers, in which a number $N_E \cdot N_R$ of available bi-static configurations is greater than or equal to two.

In particular embodiments, the number $N_R$ of receiver devices is greater than or equal to two and the estimation of the position of the aircraft includes a measurement of the time difference of arrival of the signal received by each receiver device.

Such arrangements allow limiting the need for synchronisation between transmitters and receivers. Indeed, there is then no need for time and frequency synchronisation between a transmitter and a receiver, and only the different receivers must be synchronised with each other to perform measurements of the TDOA type ("Time Difference Of Arrival"). Also, in this case, it is not necessary for the receivers to know the position of the transmitter(s).

In particular embodiments, the number $N_E$ of transmitter devices is greater than or equal to two and the estimation of the position of the aircraft for a receiver device comprises a determination of at least two detection scores associated respectively with at least two transmitter devices, and the detection scores are projected into a common geometry and then cumulated.

In particular modes of implementation, a decision on the estimation of the position of the aircraft is based on a combination of elementary decisions corresponding respectively to different bi-static configurations among the $N_E \cdot N_R$ available bi-static configurations.

Such arrangements allow improving the sensitivity of detection and the accuracy of geolocation of a target In particular modes of implementation, the method further includes a step of organising the different satellites respectively carrying the different transmitter devices into constellations such that, for any region of interest on the Earth's surface, there is always a direct line of sight towards said region of interest for several ones of said satellites.

In particular modes of implementation, a satellite telecommunication network also enables a data exchange between two transmitter devices, between two receiver devices, between a transmitter device and a receiver device, between a control station on the ground and a transmitter device, or between a control station on the ground and a receiver device.

PRESENTATION OF THE FIGURES

Figure 2:
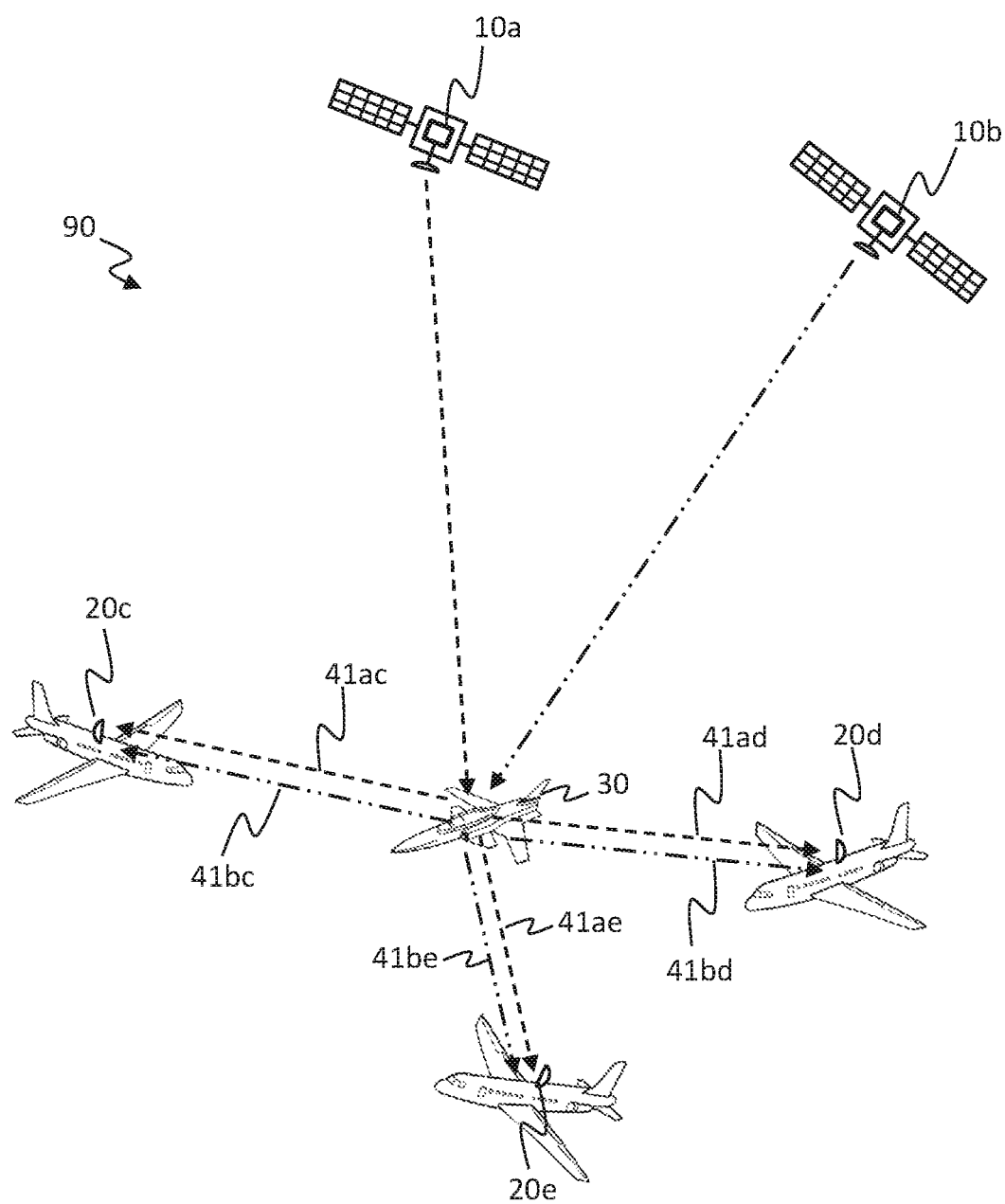
Figure 3:
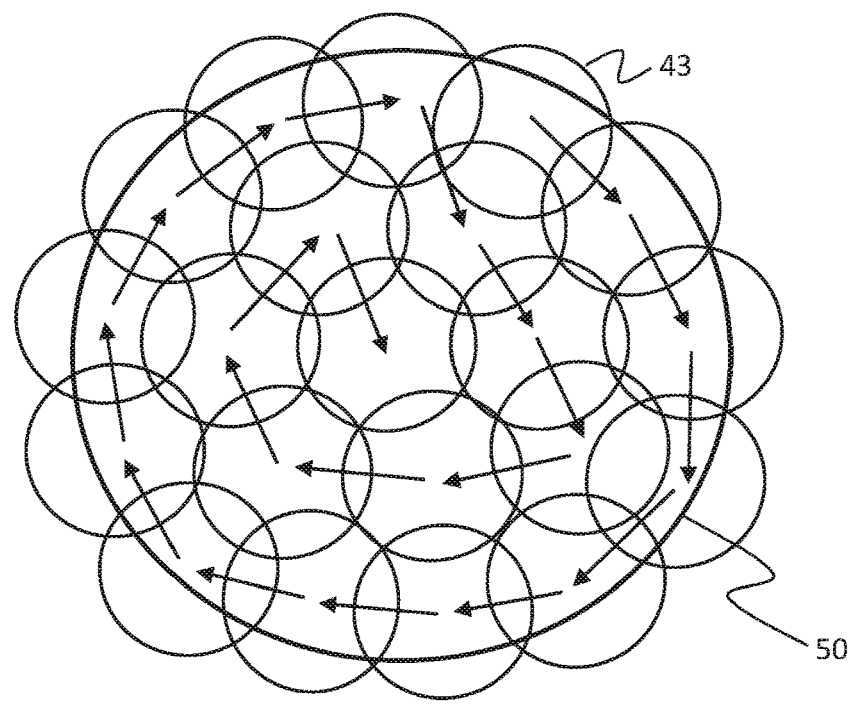
Figure 4:
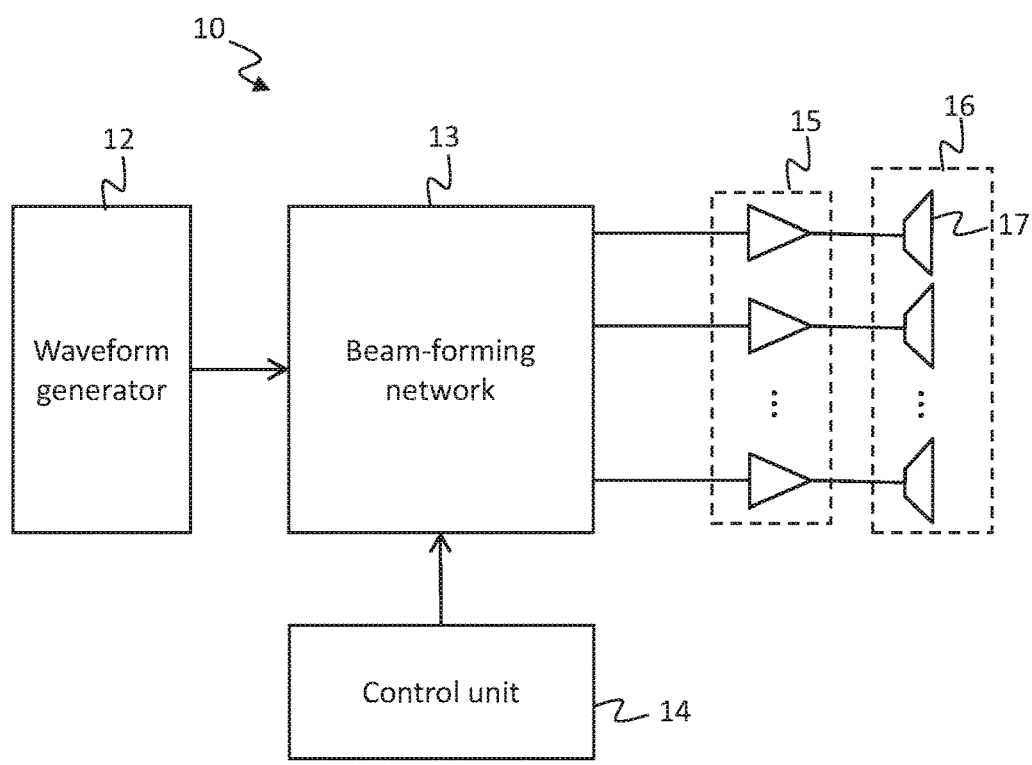
Figure 5:
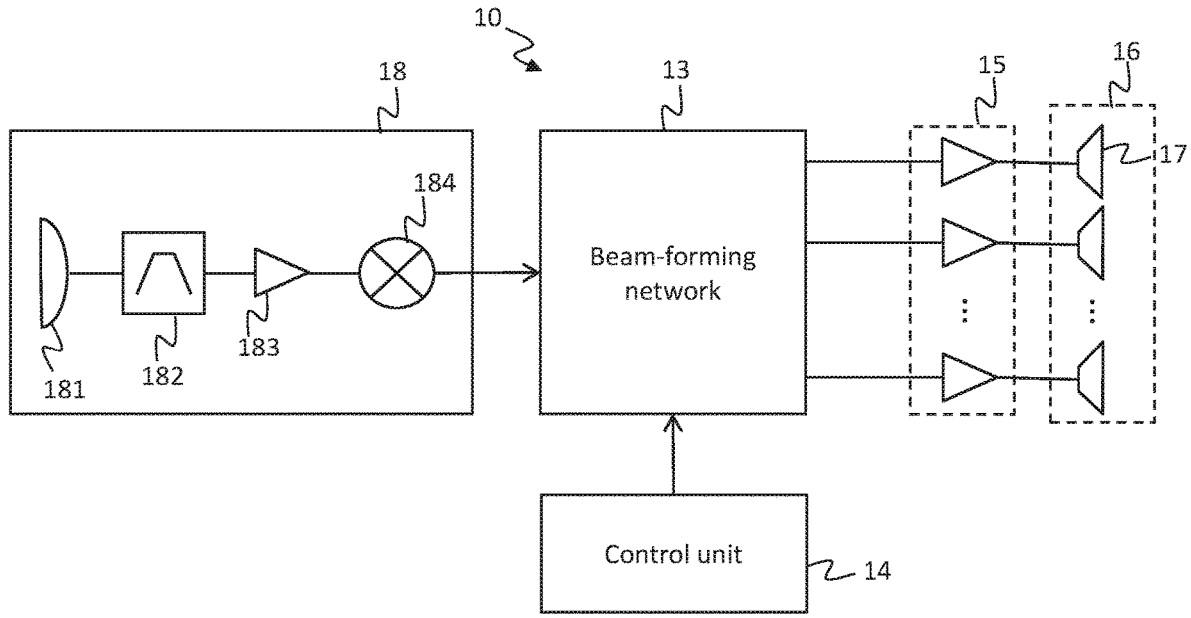
Figure 6:
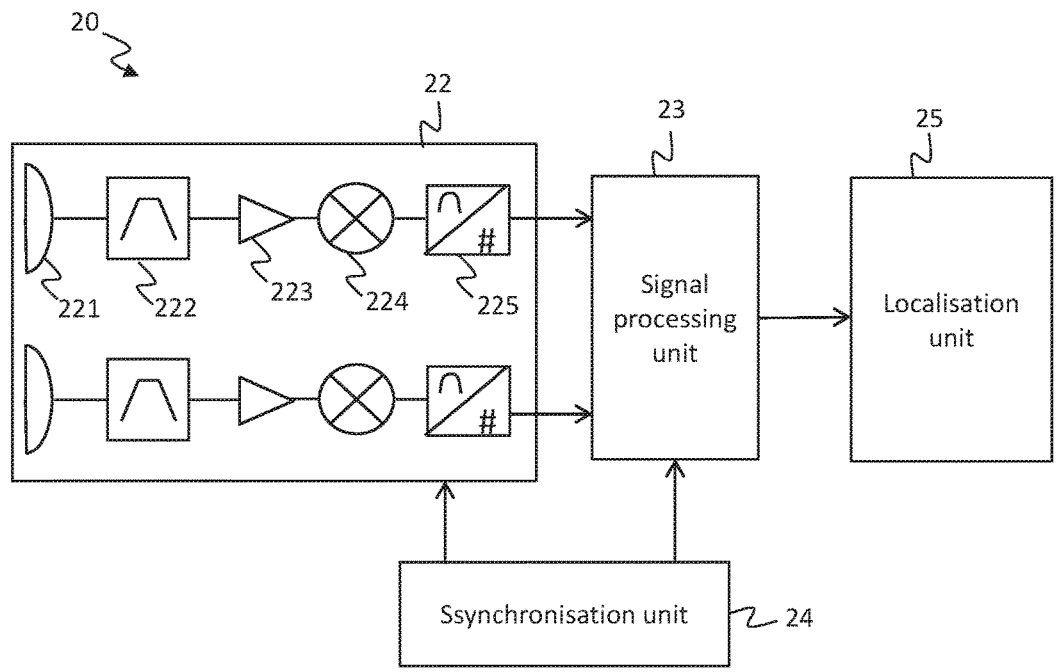
Figure 7:
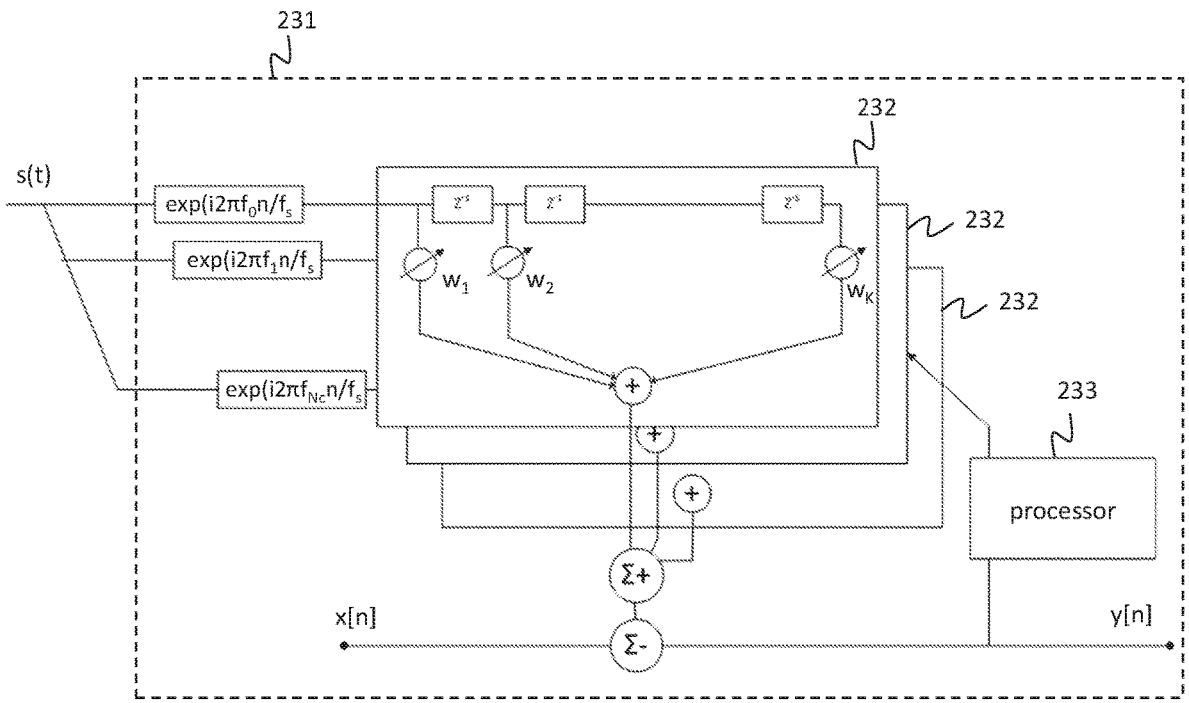
Figure 8:
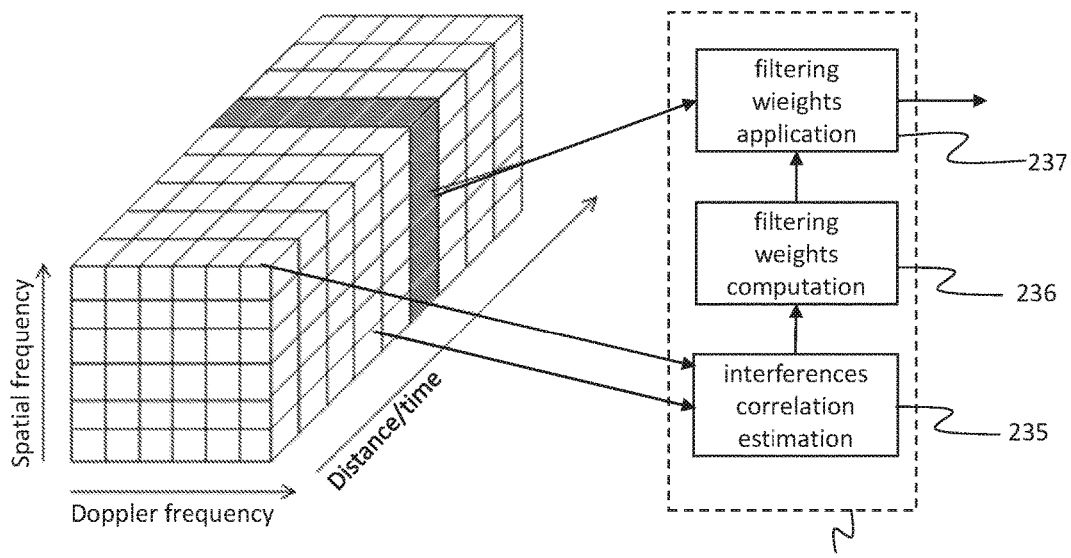
Figure 9:
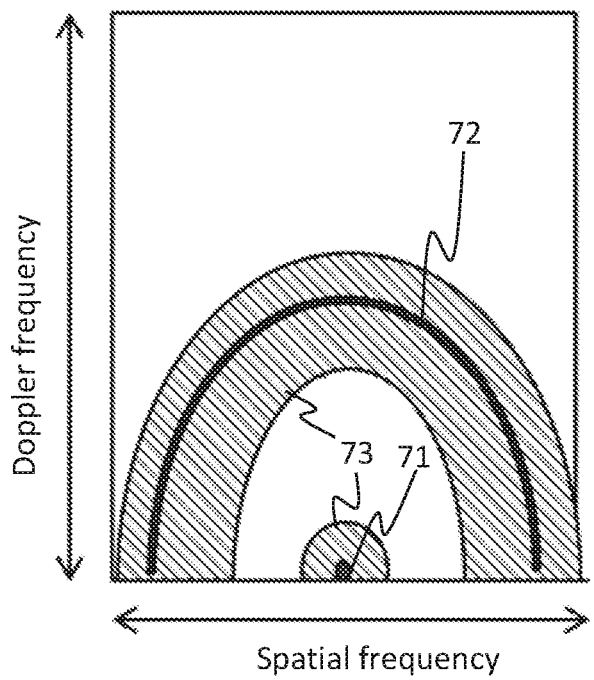
Figure 10:
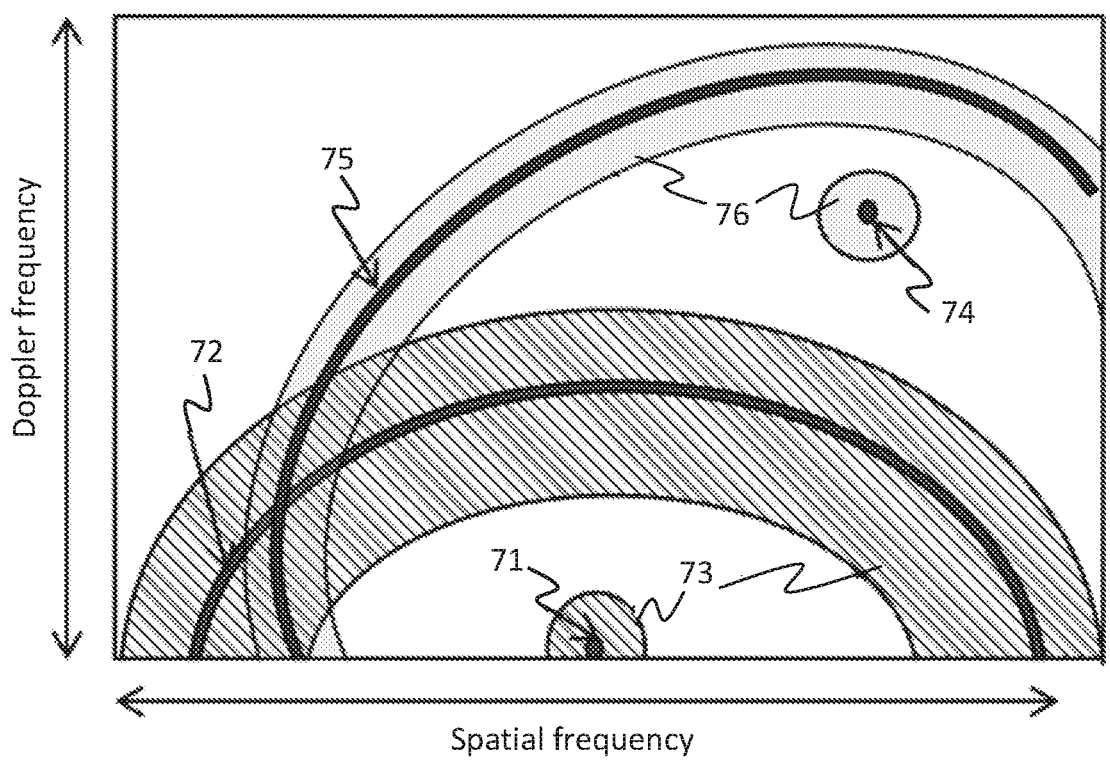
Figure 11:
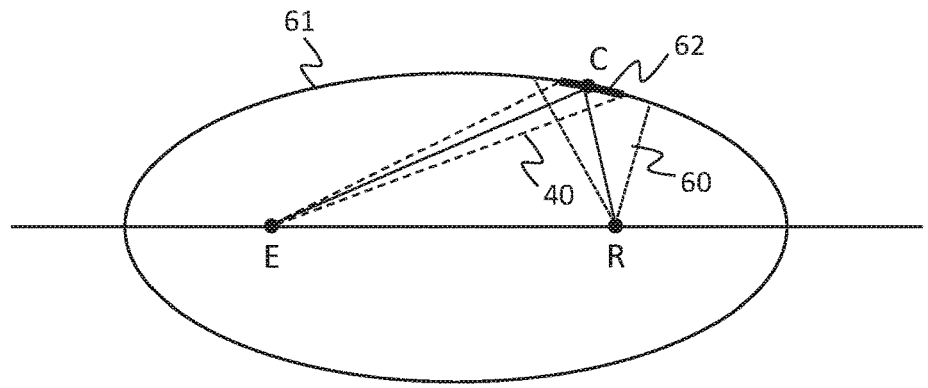
Figure 12:
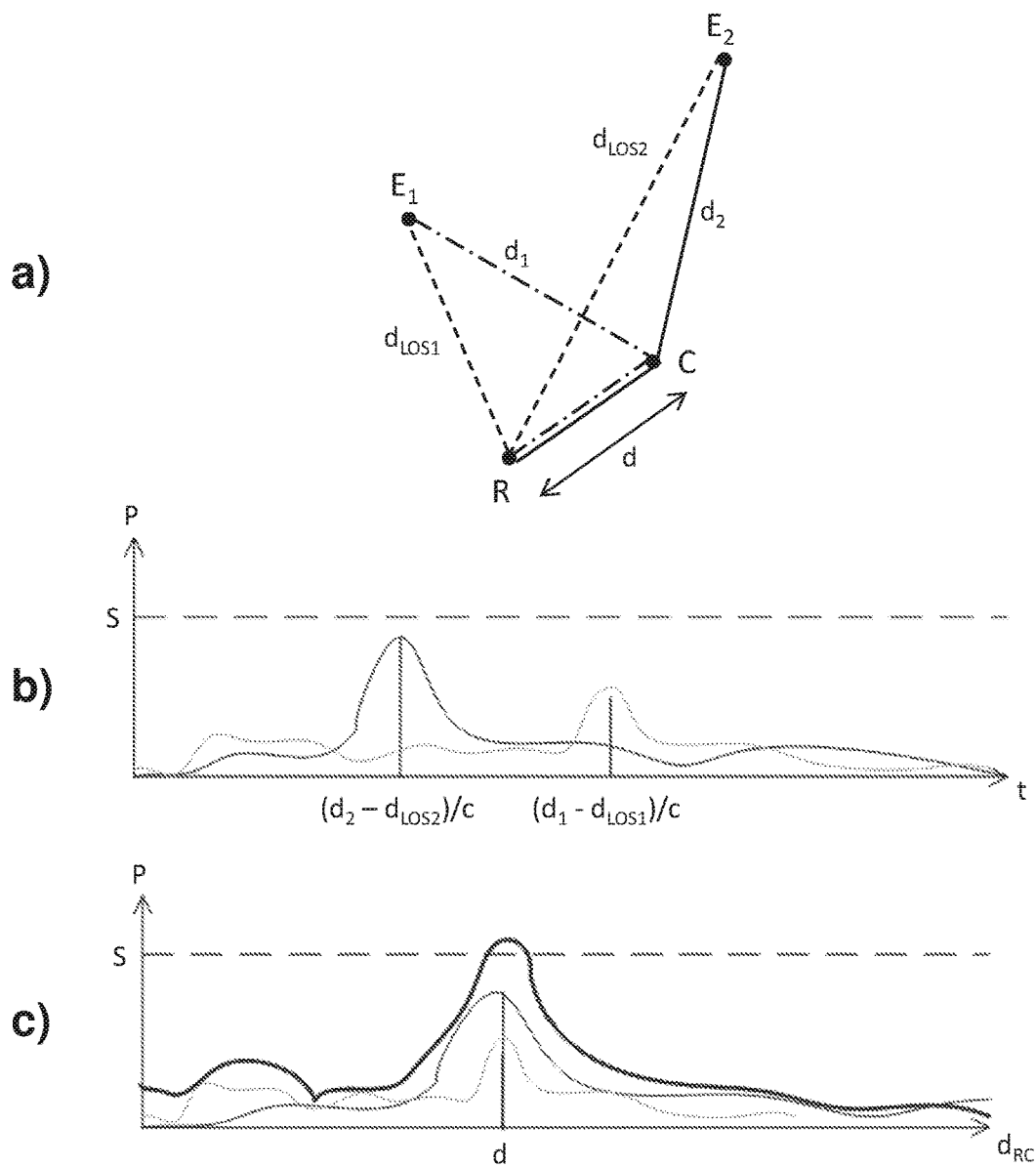
Figure 13:
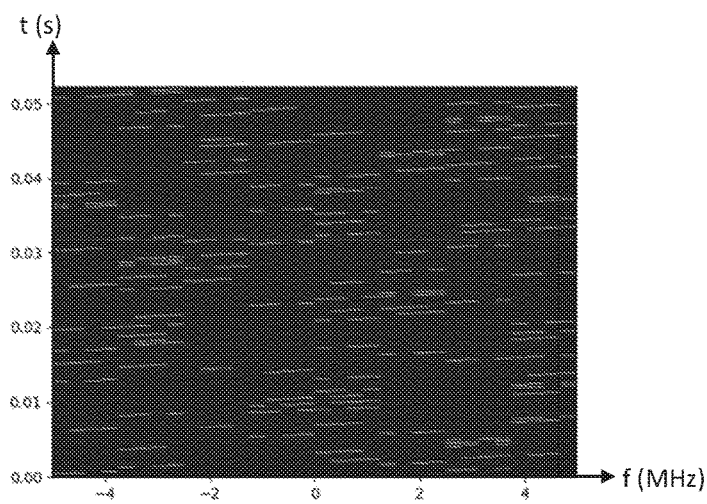

The invention will be better understood upon reading the following description, given as a non-limiting example, and made with reference to FIGS. 1 to 18 which represent:

FIG. 1 a schematic representation of a bi-static radar system according to the invention, FIG. 2 a schematic representation of a multi-static radar system according to the invention, FIG. 3 a schematic representation of the use of an illumination sequence to illuminate a region of interest, FIG. 4 a schematic representation of an embodiment of a transmitter device according to the invention, FIG. 5 a schematic representation of another embodiment of a transmitter device according to the invention, FIG. 6 a schematic representation of an embodiment of a receiver device, FIG. 7 a schematic representation of an adaptive filtering module to reduce the contribution of the interference in a signal received by a receiver device, FIG. 8 a schematic representation of a space-time processing module to implement an adaptive filtering in the Doppler frequency/spatial frequency domain, FIG. 9 a schematic representation of the principle of a STAP-type two-dimensional filtering in the Doppler frequency/spatial frequency domain, FIG. 10 an illustration of the advantage of having two different measurement configurations based on two different transmitter devices in the case of a STAP-type two-dimensional filtering in the Doppler frequency/spatial frequency domain, FIG. 11 a schematic representation of a particular mode of implementation of an estimation of the position of a target by a detection and localisation unit of the receiver device, FIG. 12 a schematic representation of the principle of accumulation of detection scores associated respectively with different transmitter devices, FIG. 13 a representation of a spectrogram of a linear "chirp" signal with a random fluctuation of the central frequency over time, FIGS. 14a, 14b, 14c, 14d are representation of an auto-ambiguity function for a useful signal (part a) and for a parasitic signal (part b); a representation of an ambiguity function calculated respectively by a receiver device not belonging to the system (part c) and by a receiver device belonging to the system (part d) when the transmitted signal is protected by a parasitic signal.

Figure 15:
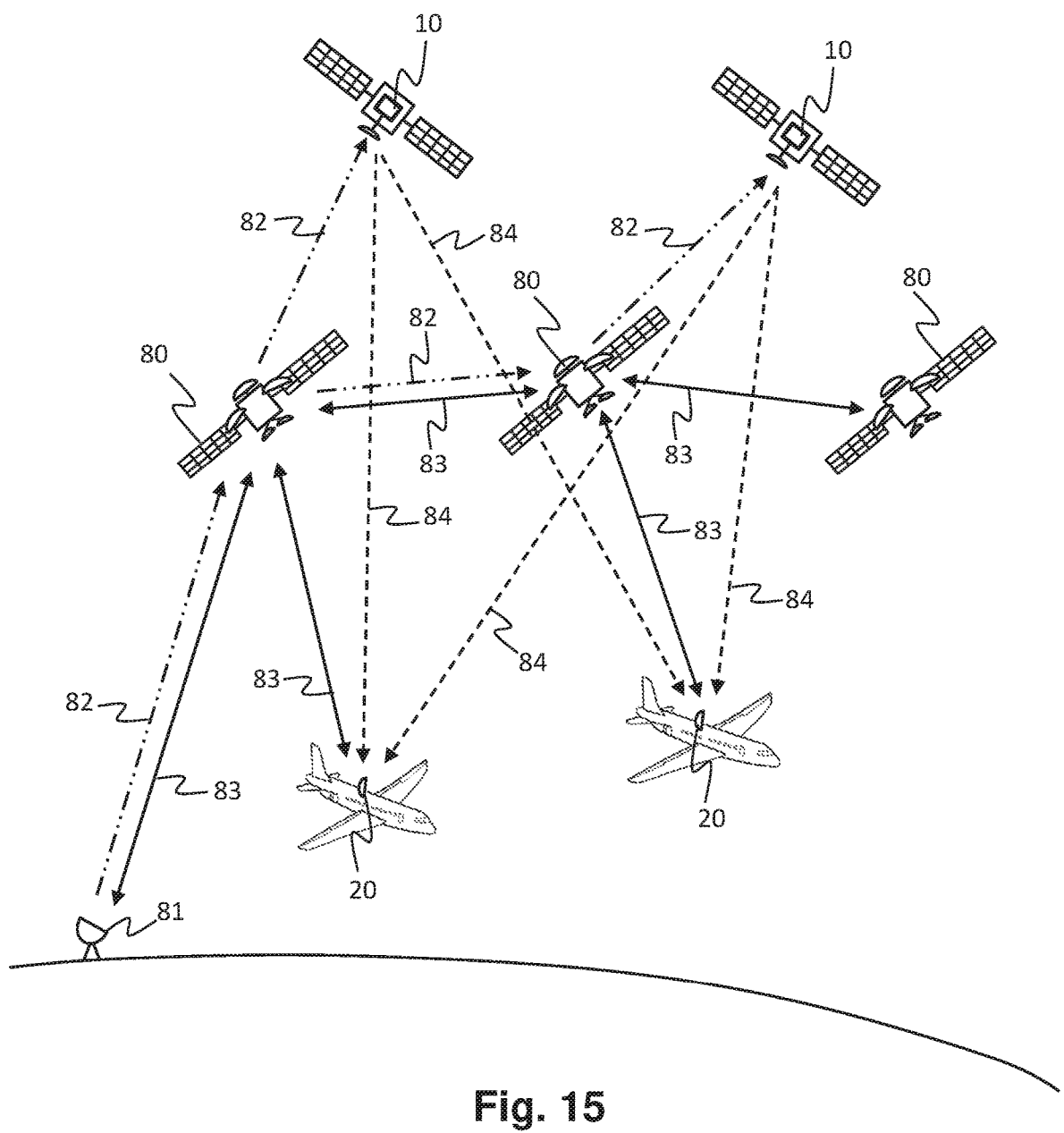

FIG. 15 a schematic representation of the use of a satellite telecommunication network for exchanging data between different entities of the radar system according to the invention, FIG. 16 a schematic representation of a first example of implementation of the invention, FIG. 17 a graph representing different operating points of the first example described with reference to FIG. 12, FIG. 18 a schematic representation of the main steps of an aerial surveillance method using a bi-static or multi-static radar system according to the invention.

In these figures, identical references from one figure to another refer to identical or similar elements. For clarity, the represented elements are not necessarily plotted to the same scale, unless stated otherwise.

DETAILED DESCRIPTION OF AN EMBODIMENT OF THE INVENTION

A) Description of the Radar System

FIG. 1 schematically represents an example of a bi-static radar system 90 according to the invention. The target 30 aimed at by the radar system 90 is an aircraft. The radar system 90 includes a transmitter device 10 on board a satellite 11 orbiting the Earth, and a receiver system 20. In the example illustrated in FIG. 1, the transmitter device 20 is on board an airplane 21. However, nothing prevents that, in some variants of the invention, the receiver device 20 is on board another platform type, such as a satellite, a land vehicle or a ship.

The transmitter device 10 corresponds to the payload, or to at least one portion of the payload of the satellite 11 in which it is carried.

The transmitter device 10 and the receiver device 20 are coordinated with each other to cooperate. In particular, this means that the transmitter device 10 is especially configured to focus the energy of a radio signal transmitted by said transmitter device towards a region of interest 50 monitored by the receiver device 20. For this purpose, the transmitter device 10 is configured to obtain information relating to the region of interest 50 and to orient a radio beam 40 such that it illuminates the region of interest at least partially. On the other hand, the receiver device 20 is intentionally positioned proximate to the region of interest 50 in which it is desired to detect and geolocate a target 30 such that the receiver device 20 is capable of receiving a signal 41 transmitted by the transmitter device 10 and reflected by the target 30.

In FIG. 1, the region of interest 50 is represented by a geographical region on the Earth's surface 51. The radio beam 40 is then oriented such that the footprint 43 on the ground of the radio beam 40 covers at least one portion of the region of interest 50. However, the region of interest could also correspond to a volume in which it is desired to detect and geolocate a target. The radio beam is then oriented such that the intersection of the beam with the region of interest is non-zero.

For example, the information on the region of interest 50 that should be monitored may be transmitted to the transmitter device 10 and to the receiver device 20 by a control station on the ground (not represented in FIG. 1). According to another example, the information on the region of interest 50 that should be monitored may be transmitted to the receiver device 20 by the transmitter device 10. According to still another example, the information on the region of interest 50 that should be monitored may be transmitted to the transmitter device 10 by the receiver device 20.

The receiver device 20 then seeks to detect an echo generated by the reflection of the signal 41 on the target 30 by searching for replicas of the transmitted signal shifted in time and in frequency in the signal received by the receiver device 20.

In the considered example illustrated in FIG. 1, the transmitter device 10 and the receiver device 20 are synchronised in time and frequency (they use a common time and frequency base). Also, the receiver device 20 knows the content and the instant of transmission of the signal 41. For example, the receiver device includes an electronic memory in which are memorised the parameters necessary for the generation of a reference replica of the signal transmitted by the transmitter device 10. A calculation of an ambiguity function between this reference replica and the received signal can then allow detecting and geolocating the target 30. Indeed, the time and frequency shifts of the signal 41 reflected by the target 30 with respect to the signal transmitted by the transmitter device 10 are representative of the position of the target 30 with respect to the transmitter device 10 and to the receiver device 20.

The ability to detect a target can be estimated from the signal-to-noise ratio $SNR_R$ (acronym of "Signal-to-Noise Ratio") of the signal received by the receiver device 20. This signal-to-noise ratio $SNR_R$ can be quantified by means of the radar equation hereinbelow:

$$SNR_R = \frac{P_t G_t G_r t_{int} \lambda^2 \sigma}{(4\pi)^3 k_B T_0 F_R L d_E^2 d_R^2} \quad \text{[Math. 1]}$$

wherein:
- $\sigma$ is the Radar Cross-Section (RCS),
- $P_t$ is the average transmission power,
- $G_t$ is the antenna transmission gain in the direction of the target,
- $G_r$ is the antenna reception gain in the direction of the target,
- $\lambda$ is the wavelength,
- $T_0$ is the reference noise temperature usually taken equal to 290K,
- $F_R$ is the noise factor of the reception chain,
- $d_E$ is the distance between the transmitter and the target,
- $d_R$ is the distance between the target and the receiver (detection range),
- L represents the losses of the system (propagation, processing, impact of the interferences),
- $t_{int}$ is the integration time of the measurement,
- $K_B$ is Boltzmann's constant.

It should be noted that the received power levels for a signal directly received from the transmitter device 10 and/or for signals 42 originating from the transmitter device and reflected by the Earth's surface 51 may have several orders of magnitude higher than the signal 41 reflected by the target 30. These signals could then impair the ability to detect the target 30. Nevertheless, the interference due to the direct signal and the signals reflected by the ground can, under some conditions, be significantly reduced through the use of signal processing techniques which will be detailed later on. Under this assumption, the detection performances can be assessed by testing the ability to discriminate the signal of interest from the reception thermal noise and from the residual interference level.

As illustrated in FIG. 2, the radar system 90 may be a multi-static radar system including several transmitter devices 10 and/or several receiver devices 20 to probe a region of interest at a given instant. Such arrangements allow improving the detection capabilities by transmission diversity and/or reception diversity. In the example illustrated in FIG. 2, the radar system 90 includes two ($N_E$=2) transmitter devices 10a, 10b and three ($N_R$=3) receiver devices 20c, 20d, 20e. Thus, this allows multiplying the detection configurations, and thus the detection capabilities of the system, by carrying out $N_E \cdot N_R$ bi-static operations ($N_E \cdot N_R$=6 in the example of FIG. 2).

Different simultaneous processing modes may be implemented, allowing increasing the revisit frequency of a sub-region of the region of interest to be monitored and/or increasing the detection sensitivity by combining the observables from the different available bi-static configurations. As illustrated in FIG. 2, a first receiver 20c receives a signal 41ac transmitted by a first transmitter device 10a and reflected by the target 30 as well as a signal 41bc transmitted by a second transmitter device 10b and reflected by the target 30; a second receiver 20d receives a signal 41ad transmitted by the first transmitter device 10a and reflected by the target 30 as well as a signal 41bd transmitted by the second transmitter device 10b and reflected by the target 30; a third receiver 20e receives a signal 41ae transmitted by the first transmitter device 10a and reflected by the target 30 as well as a signal 41be transmitted by the second transmitter device 10b and reflected by the target 30.

B) Transmitter Device

In the invention, the transmitter devices 10 are intended to be carried in satellites to be localised in exo-atmospheric space in order to be able to illuminate one or more region(s) of interest located in the vicinity of the terrestrial globe. Any type of orbit can be considered for the satellites carrying the transmitter devices 10: from low orbit (from an altitude of 300 kilometres) up to geostationary-type orbits.

To allow satisfactory detection performances, a transmitter device 10 must include an antenna having a high gain $G_t$ and therefore a high directivity. The footprint 43 of this antenna and therefore the region in which it provides an interesting detection capability is possibly smaller than the region of interest 50 (as illustrated in FIG. 1). In such a case, the transmitter device 10 should be configured to be able to quickly scan the region of interest 50 with a radio beam 40 by successively orienting said radio beam according to different directions to successively cover different constituent sub-regions of the region of interest 50.

As illustrated in FIG. 3, it is possible to determine an illumination sequence for a transmitter device 10. The illumination sequence includes for example several directions of the main axis of the radio beam 40 to be applied successively to cover the entire region of interest 50 with the sub-regions 43 sequentially illuminated. The illumination sequence may be deterministic or pseudo-random. Advantageously, the illumination sequence may be known to the receiver device to avoid useless search for targets in non-illuminated regions. In such a case, the transmitter device 10 may for example be configured to communicate to the receiver device 20 the performed illumination sequence. Alternatively, the illumination sequence to be performed may be transmitted both to the receiver device 20 and to the transmitter device 10 by a control station on the ground.

It may also be advantageous for different transmitter devices 10 to be synchronised with each other to simultaneously follow the same illumination sequence. Such arrangements allow promoting transmission diversity.

Independently of the illumination sequence, it is preferable to be able to continuously orient a radio beam 40 produced by a transmitter device 10 to maintain the illumination of a region of interest the time the satellite flies over said region (scrolling of the satellite relative to the Earth when the satellite is not a geostationary satellite).

For this purpose, the transmitter device 10 may include a mechanically or electronically repointable antenna with or without a reflector. To enable this rapid repointing in various circumstances, the use of a phased array antenna (electronic repointing) is to be preferred over an antenna with mechanical repointing for reasons related to the responsiveness of the system.

The repointing of a radio beam 40 is controlled by a control unit of the transmitter device 10 according to information on the region of interest 50 to be monitored. For example, this information may be transmitted by a control station on the ground. For example, this information may correspond to a set of weights to be applied to different inputs of a beam-forming network (BFN, standing for "Beam-forming network"). According to another example, this information may correspond to a direction (or to a sequence of directions) that the radio beam 40 must follow, the weights to be applied at the beam-forming network then being calculated by the control unit of the transmitter device 10. According to still another example, this information may correspond to the geographical coordinates of the region of interest, and the transmitter device 10 is then responsible for calculating an illumination sequence as well as the weights to be applied at the beam-forming network to perform said sequence.

The signal transmitted by the transmitter device 10 may be a signal received from a ground station and repeated by the transmitter device 10 (similar to what is achieved by a telecommunication satellite in transparent mode). Alternatively, and preferably, the waveform of the signal transmitted by the transmitter device 10 is generated directly by the transmitter device 10 on board the satellite 11, in a stand-alone manner.

In the case of a signal generated in a direct and standalone manner on board the satellite 11 by the transmitter device 10, it is possible to control the waveform of the signal to be transmitted via a remote control interface. For example, a waveform generator of the transmitter device 10 is initialised by a ground station via a secure communication channel. In some embodiments, the waveform generation method is shared between the transmitter device 10 and the receiver device 20 so as to minimise the amounts of information to be exchanged for coordination thereof.

FIG. 4 schematically represents an embodiment of a transmitter device 10 according to the invention including a waveform generator 12, a beam-forming network 13, a control unit 14, an amplification stage 15 and a phased array antenna 16 including a plurality of antenna elements 17. The waveform generator 12 may be controlled by a synchronisation signal originating from a time distribution system such as a satellite navigation system (GNSS, standing for "Global Navigation Satellite System") or from an ultra-stable clock (atomic clock for example). The control unit 14 calculates the complex coefficients (weights) to be applied to the different antenna elements by the beam-forming network 13. In the example illustrated in FIG. 4, a signal transmitted by the transmitter device 10 is generated directly on board the satellite in a standalone manner.

FIG. 5 schematically represents another embodiment of a transmitter device according to the invention for which a signal transmitted by the transmitter device 10 is a repetition of a signal received from a ground station. The transmitter device 10 does not include a waveform generator. On the other hand, the transmitter device 10 includes a reception chain 18 to receive the signal transmitted by the ground station and to re-transmit said signal after amplification and frequency transposition. For this purpose, the reception chain 18 includes, in a conventional manner, a reception antenna 181, a filter 182, an amplifier 183 and a frequency converter 184. Otherwise, the transmitter device illustrated in FIG. 5 is identical to the transmitter device 10 described with reference to FIG. 4.

A transmitter device 10 according to the invention also includes an electronic memory in which is memorised the information relating to the region of interest 50 to be monitored, allowing suitably orienting a radio beam 40 generated by the transmitter device (for example geographical coordinates of the region of interest 50, an illumination sequence or network formation configuration parameters). The transmitter device 10 may also include a communication module (not represented in the figures) for exchanging information with a control station on the ground, with a receiver device 20 and/or with another transmitter device 10.

It may be advantageous for the positioning of the targets that the transmitter device 10 be provided with an accurate orbit determination device in order to transmit its ephemerides and information on the local time to a coordination station on the ground, or to transmit this information as secondary modulation in the radar signal to the receiver devices 20.

Preferably, the different transmitter devices 10 of the system should not interfere with each other. A spectrum sharing mechanism based on a non-exclusive separation of frequency, code, time or polarisation may be implemented.

The satellites carrying the different transmitter devices 10 may be organised into constellations so that there is always a direct line of sight for several satellites towards any region of interest proximate to the Earth's surface. Different examples of this type of constellations can be found on existing or planned constellations of low-orbit telecommunication satellites, satellite positioning systems, or Earth observation satellites.

B) Receiver Device

FIG. 6 schematically represents an example of a receiver device 20 of the radar system 90 according to the invention. The receiver device 20 is in charge of detecting a signal reflected by a target and discriminating it from the thermal noise and from the interference. This interference may be derived from the direct signal, from the ground clutter (parasitic echoes reflected by the ground), or from intentional interference (jamming).

The receiver device 20 includes a reception chain 22 which can include one or more reception channel(s) each consisting, in a conventional manner, of an antenna system 221 possibly repointable mechanically or electronically, of an analog portion enabling filtering 222, amplification 223, frequency conversion 224 and digitisation 225 of the signals.

There may exist in the reception chain 22 a reference channel configured to receive a signal originating directly from the transmitter device 10 (without reflection on a target or on the ground). Such a reference channel may be used for purposes of analog suppression of the direct signal, and/or for purposes of assisting in the synchronisation in time and frequency of the receiver device 20 and/or for purposes of digital suppression of the direct signal.

The obtained digital streams are sent towards a signal processing unit 23 whose operations aim to limit the effects of masking by interference of the signal reflected by a target.

A synchronisation unit 24 is responsible for providing a synchronisation signal. This time and frequency synchronisation may be obtained based on the reception on the reference channel of the signal transmitted directly by the transmitter device 10 at a frequency and at a transmission instant known to the receiver device 20. In other examples, synchronisation may be obtained using a time distribution system such as a satellite positioning system or using an ultra-stable clock).

The synchronisation unit 24 may also be responsible for providing the signal processing unit 23 with a reference replica of the transmitted signal memorised by the transmitter device.

Finally, the receiver device 20 includes a detection and localisation unit 25. The localisation is based on a measurement of the propagation time of the signal between the transmitter device and the receiver device, or on a measurement of the time difference of arrival of the signal at several receivers (the so-called TDOA method, standing for "Time Difference Of Arrival").

The receiver device 20 may also include a communication module (not represented in the figures) for exchanging information with a control station on the ground, with a transmitter device 10 and/or with another receiver device 20.

It should be noted that the detection and/or the localisation may also be implemented in an entity distinct from a receiver device 20, for example by a control station on the ground, based on measurements performed by one or more receiver device(s) 20.

D) Principle of the Detection

The principle of the detection is that of detection by a bi-static radar, namely a detection of local maxima caused by a target of interest on an estimate of the ambiguity function, or an approximation of the latter, which covers the particular case of pulse-Doppler processing.

The main processing difficulty in the case of an airborne bi-static radar lies in the limitation of the impact of the return of ground clutter (parasitic echoes received by a receiver device after reflection on the ground) and of the direct signal (signal transmitted by the transmitter device received directly by the receiver device without reflection on the target). Indeed, the signal reflected by the ground and the signal received in direct line from the transmitter satellite can be received with a power level much higher than the signal received from the target (signal of interest), and they can consequently mask the signal of interest.

Different methods can be considered to limit these masking effects of the signal of interest.

In particular, it is possible to implement a cancellation in the analog domain, upstream of the digitisation, of the component due to the direct signal in the received signal, by subtraction of the reference signal (memorised signal or signal received on a reference channel) with appropriate gain and phase.

Besides, it is possible to implement a cancellation in the digital domain, after digitisation, to reduce the contribution of some particularly powerful interference (ground clutter) by cascading several filters and by including frequency-translated replicas of the reference signal therein. FIG. 7 schematically illustrates an example of an adaptive filtering module 231 comprised in the signal processing unit 23 of a receiver device 20 to implement such a digital cancellation. The contribution of the direct signal and of the strong clutter echoes is limited by subtraction in the digitised received signal x[n]. Several adaptive filters 232 take as input a Doppler-shifted version of the reference signal s(t). In each adaptive filter 232, the weights w, of the filters associated respectively with the different antenna elements of the reception antenna of the receiver device 20 are calculated by a processor 233, with a fast refresh rate, to minimise the power of the signal y[n] obtained as output.

These two types of cancellation (analog and digital) can be combined in some cases. The analog cancellation allows reducing the digitisation dynamics and thus avoiding the introduction of quantisation noise in the processing. The digital cancellation allows suppressing a portion of the clutter and residue returns from the direct signal. Whether in the digital domain or in the analog domain, the signal cancellation loop aims to minimise the power of the output signal y[n] to limit the effects of masking a strong signal on a weak signal.

Alternatively or complementarily, and as illustrated in FIG. 8, the signal processing unit 23 may include a spatio-temporal processing module 234 to implement adaptive filtering in the Doppler frequency/spatial frequency domain (also called angular frequency). This adaptive filtering is based on an estimation of the covariance matrix in the Doppler frequency/spatial frequency domain of the ground clutter returns. Afterwards, this covariance matrix is used to maximise the signal-to-noise plus interference ratio of the detection over the entire detection cube according to the three dimensions Doppler frequency, spatial frequency, and time/distance. The objective of this filtering is to suppress returns originating from the ground according to the statistical properties of the measurement made thereof in the Doppler/spatial frequency domain. The effectiveness of this filtering is due to the restriction on a narrow arc ("clutter ridge") of the contribution of the clutter in the Doppler/spatial frequency domain.

In FIG. 8, each cube corresponds to a coherent integration time for an antenna element of the reception antenna of the receiver device 20 for a particular Doppler frequency (it should be noted that, by abuse of language, the term "Doppler frequency" corresponds to a "frequency shift of the signal due to the Doppler effect"). The purpose is to perform a two-dimensional adapted filtering allowing rejecting the ground clutter and the residuals of the direct signal. These techniques are known as STAP processing (acronym of "Space Time Array Processing"). For example, the spatio-temporal processing module 234 includes a module 235 for estimating the correlation of the interferences, a module 236 for calculating the filtering weights and a module 237 for applying said filtering weights.

As illustrated in FIG. 9, clutter suppression by spatio-temporal processing methods can deteriorate detection capability for targets close to the clutter in the Doppler frequency/spatial frequency plane because of the imperfect implementation of filtering (this is primarily due to the difficulty of having a reliable estimate of the covariance matrix of the clutter). FIG. 9 represents, in the spatial frequency/Doppler frequency plane, for a satellite generating zero Doppler (zero relative velocity relative to the Earth or orthogonal to the line of sight between the target and the satellite), the location 71 of the direct signal, the location 72 of the clutter, and an area 73 (hatched) of lesser detectability of the targets. This area 73 of lesser detectability is due to spatio-temporal imperfections of filtering. It consists of an area for which the signal-to-noise ratio losses compared to the optimum signal-to-noise in the absence of clutter and filtering exceeds a given threshold.

The detection is done by comparing the estimated power in each spatial frequency/Doppler frequency/distance box after focusing by the spatio-temporal processing. The detection threshold is usually set to correspond to a given false alarm probability using an a priori statistic of the detection noise. In the STAP type spatio-temporal processing context, the signal-to-noise plus interference ratio is expressed as a function of the signal correlation matrix. The detection background noise may be estimated by knowing the correlation matrix for each distance box of the thermal noise and the interfering signals. Adapted filtering creates areas in the spatial frequency/Doppler frequency domain in which the return of the signals will be significantly attenuated. Consequently, the return from a target located in these areas will be significantly attenuated and the target will probably not be able to be detected. These areas of lesser detectability depend on the desired depth of rejection, the quality of the estimation of the correlation matrix of the clutter and the spectral width of the clutter in a distance/spatial frequency box.

In the radar system according to the invention, the possibility of having different geometric measurement configurations (diversity generated by the different available bi-static configurations provided by several transmitter devices and/or several receiver devices) allows maximising the probability that a target is not in the same spatial frequency/Doppler frequency domain as the clutter returning from the ground. An illustration of this effect is given by FIG. 10 which represents in the spatial frequency/Doppler frequency plane the localisation 71 of the direct signal, the localisation 72 of the clutter, and the area 73 of least detectability for a first transmitter device, as well as the localisation 74 of the direct signal, the localisation 75 of the clutter, and the area 76 of least detectability for a second transmitter device. The area of least detectability resulting from the accumulation of the measurements derived from several transmitter devices is the intersection of the areas of least detectability on the different measurement configurations (intersection of the hatched areas). Hence, the resulting area of least detectability is significantly smaller than the area of least detectability in the case where one single transmitter device is used.

E) Principle of the Localisation

The detection and localisation unit 25 is configured to estimate the position of a target 30 based on information representative of the distance between the target 30 and the receiver device 20. FIG. 11 schematically illustrates an example of implementation of this estimation of the position of the target 30 by the detection and localisation unit 25. The point E corresponds to the position of a transmitter device 10, the point R corresponds to the position of a receiver device 20, the point C corresponds to the position of the target 30 to be detected. The determination by the detection and localisation unit 25 of a time shift between the signal received by the receiver device 20 and the reference replica allows accessing the difference between on the one hand the sum (EC+RC) of the distance between E and C and the distance between R and C, and on the other hand the distance between E and R. Knowing the distance between E and R, it is possible to localise C on the ellipsoid 61 whose foci are E and R. If available, and as illustrated in FIG. 11, knowing the position of the illumination cone of the radio beam 40 by the transmitter device 10 and/or of the visibility cone 60 of the receiver device 20 can be exploited to limit the estimation of the position of the target 30 to a restricted angular sector 62 of the ellipsoid 61 (in the example illustrated in FIG. 11, this angular sector 62 corresponds to the intersection between the illumination cone of the radio beam 40, the visibility cone 60 and the ellipsoid 61).

This information is enough to trace the localisation of the target having caused the echo. A Doppler measurement allows access to the rate of evolution of the distance representative of the geometry of the measurement and the velocity of the target. It should be noted that so-called super resolution methods (MUSIC for example) can be used to refine the angular localisation of the targets at resolutions well below the −3 dB aperture angle of the antenna used by the receiver.

Advantageously, a radar system 90 according to the invention is a multi-static radar system including several transmitter devices 10 and/or several receiver devices to generate transmission diversity and/or reception diversity. Indeed, if we denote $N_E$ the number of transmitter devices 10 and $N_R$ the number of receiver devices 20, where $N_E$ and $N_R$ are positive natural integers, we have a number $N_E \cdot N_R$ ($N_E$ multiplied by $N_R$) of bi-static configurations. This allows multiplying the distance measurements and the angular measurements when $N_E \cdot N_R$ is greater than or equal to two ($N_E \cdot N_R \geq 2$). These measurements are characterised by an error covariance depending on the measurement configuration (geometry, signal-to-noise ratio, relative orientation between the transmitter device, the receiver device and the target, etc.). Knowing the correlation of the error allows optimally weighting (in the sense of least squares for example) the consideration of the different measurements in the target positioning problem. This positioning problem may be expressed as the determination of the position minimising the quadratic error between the measured observables (distance, angular position) and these same observables corresponding to a given position defined based on the measurement characteristics.

When the number $N_R$ of receiver devices 20 is greater than or equal to two ($N_R \geq 2$), the produced observable can be expressed in the form of a time difference of arrival, at the different receiver devices 20, of the signal transmitted by a transmitter device 10 and reflected by a target 30. This measurement of the time difference of arrival may be supplemented by angular information derived from the state of the antenna system or from a space-time processing. The localisation can then be carried out using time differences of arrival using conventional TDOA methods for locating a radio-frequency source (the radio-frequency source in this case being the target reflecting the transmitted signal). The information provided by a time difference of arrival in the case of the multi-static radar will be the location on a hyperboloid rather than on an ellipsoid as in the case of the bi-static radar. One of the advantages of using a differential propagation time measurement between two receiver devices is that it is not necessary to know the position of the transmitter device, to the extent that the distance between the transmitter device and the target is cancelled by difference. Also, it is not necessary to maintain synchronisation in time and frequency between a transmitter device and a receiver device. Only time and frequency synchronisation between the different receiver devices is required.

When the number $N_E$ of receiver devices 20 is greater than or equal to two ($N_E \geq 2$), it is possible to couple detection scores associated respectively with the different transmitter devices by projecting them into a common geometry to improve the detection capabilities of the system.

FIG. 12 illustrates this principle with an example in which two detection scores respectively associated with transmissions originating from two transmitter devices 10 in a given direction. The respective positions $E_1$ and $E_2$ of the two transmitter devices 10, the position C of the target 30 and the position R of a receiver device 20 are represented in part a) of FIG. 12. We denote $d_1$ the sum ($E_1C+CR$) of the distance between $E_1$ and C and of the distance between C and R. We denote $d_2$ the sum ($E_2C+CR$) of the distance between $E_2$ and C and of the distance between C and R. We denote d the distance between C and R. We denote $d_{LOS1}$ the distance in direct line of sight between $E_1$ and R. We denote $d_{LOS2}$ the distance in direct line of sight between $E_2$ and R.

As illustrated in part b) of FIG. 12, the signals reflected towards the receiver device (positioned at R) by the target (positioned at C) originating respectively from the first transmitter device (positioned at $E_1$) and from the second device transmitter (positioned at $E_2$) have a different time shift because of the different geometry between on the one hand the ellipsoid having R and $E_1$ as foci and on the other hand the ellipsoid having R and $E_2$ as foci. If one denotes c the speed of light (which also corresponds to the speed of propagation of a radio signal), the time shift observed at the first transmitter device between the signal received after reflection and the reference signal (which would be transmitted directly by the transmitter device) is equal to $(d_1-d_{LOS1})/c$. The time shift observed at the second transmitter device between the signal received after reflection and the reference signal is equal to $(d_2-d_{LOS2})/c$. The two curves represented in part b) of FIG. 12 represent the evolution of the power P received by a receiver device as a function of time t respectively for the first transmitter device and the second transmitter device. A received power peak is observed for a time shift value $(d_1-d_{LOS1})/c$ for the first transmitter device. A received power peak is observed for a time shift value $(d_2-d_{LOS2})/c$ for the second transmitter device. Possibly, and as illustrated in part b) of FIG. 12, the amplitude of these received power peaks is not enough to exceed a detection threshold S. The amplitude of a power peak corresponds to a detection score attributed to a transmitter device.

Knowing the geometry of the measurement (i.e. knowing the positions $E_1$ and $E_2$ of the transmitter devices, the position R of the receiver device, and the direction in which a signal reflected by the target is received by the receiver device), it is possible to re-sample the signals according to a common geometry, namely the direction of the line of sight in which the signals are received by the receiver device, according to the distance dRC separating the transmitter device and the target. As illustrated in part c) of FIG. 12, the signals derived respectively from the first transmitter device and from the second transmitter device will then be coincident, enabling an increase in the useful power while the measurement noise remains decorrelated. Thus, this allows cumulating the detection scores associated respectively with the two transmitter devices. This accumulation of statistical indicators allows improving the sensitivity of detection by non-coherent accumulation of the powers measured on the different observation groups. In general, this non-coherent accumulation allows increasing the signal-to-noise ratio of the interference by a factor proportional to the root of the number of cumulative measurements.

Another solution to take advantage of the multi-static configuration to increase the detection sensitivity consists in taking a decision on the estimation of the position of the target based on a combination of elementary decisions corresponding respectively to different bi-static configurations among the $N_E \cdot N_R$ available bi-static configurations. The underlying combinatorics allows reducing the unit detection signal-to-noise ratio while keeping an acceptable probability of false detection.

F) Protection of the Waveform of the Useful Signal

In the proposed solution, the transmitter devices 10 can be listened to and located by a competing system. Indeed, the trajectories of the satellites 11 carrying said transmitter devices 10 are predictable by the laws of space mechanics. In addition, the power of the signals transmitted by the transmitter devices makes them for example easily locatable by interferometric goniometry systems located on the ground or on board aerial or space platforms. Therefore, in the absence of countermeasures, the transmitter devices 10 of a radar system 90 according to the invention can be used by potential competitors as transmitters of opportunity for a passive radar.

It is possible to include in the radar system 90 according to the invention a functionality allowing quite significantly limiting the use by a third party of the signal transmitted by a transmitter device 10. For this purpose, the signal transmitted by a transmitter device 10 is a combination (for example an addition) of a useful signal with a parasitic signal, said parasitic signal being decorrelated from the useful signal and having an ambiguity function with a main lobe with a width in the frequency domain greater than twice the maximum Doppler frequency shift likely to be observed for a target aimed at by the radar system.

A receiver device 20 of the radar system 90 knows the waveform of the transmitted signal and/or the waveform of the parasitic signal. The receiver device 20 can then calculate an ambiguity function between the received signal and the transmitted signal. For example, the transmitted signal corresponds to a reference signal memorised by the receiver device 20, or else to a reference signal received directly from the transmitter device 10 (without reflection) from which the parasitic signal is subtracted.

An unauthorised receiver wishing to make opportunistic use of the transmitted signal will have to carry out the calculation of an ambiguity function between the signal received by a search channel after reflection on the target and the signal received by a reference channel originating directly from the transmitter device (without reflection). The signal received by the reference channel contains both the waveform of the useful signal and the waveform of the parasitic signal. Nonetheless, this receiver cannot separate on board the useful signal from the parasitic signal. Indeed, the waveform of the useful signal is protected for example by a cryptographic mechanism including a secret initialisation state (such as a linear feedback shift register, or LFSR standing for "Linear Feedback Shift Register"), and the parasitic signal also has a pseudo-random nature. The secondary lobes of the ambiguity function ("Cross Ambiguity Function" or CAF) in the frequency domain of the parasitic signal will therefore raise the contamination of the signal reflected by the interferences and lower the detection sensitivity compared to that obtained from a receiver device 20 of the radar system 90.

Advantageously, the parasitic signal is a "chirp" signal having a frequency varying linearly around a central frequency for a certain period of time, with a random change in the central frequency from one period to another. An example of a spectrogram of such a signal is illustrated in FIG. 13. For example, the value of the central frequency $f_0$ changes with a period of duration T. For example, over a period T, the "chirp" signal c(t) takes the following form:

$$c(t) = A e^{j2\pi\left(f_0 + \frac{\Delta f}{T}t - \frac{\Delta f}{2}\right)t} \qquad \text{[Math. 2]}$$

where A is a constant value (amplitude of the envelope) and $\Delta f$ is the frequency band centred on the central frequency $f_0$ swept during a period T.

Nonetheless, it should be noted that, in some variants, the duration of the period during which the frequency of the signal varies linearly around the central frequency can change from one period to another. Also, the amplitude of the envelope can vary over time.

Preferably, the modulation width of the chirps (i.e. the width $\Delta f$ of the frequency band swept during a period T) can be selected so as to be greater than the maximum Doppler frequency likely to be observed for a target 30 aimed at by the radar system 90 in order to ensure that parasitic echoes returning from the ground will necessarily significantly contaminate the signal received by an unauthorised receiver not belonging to the radar system 90.

Figure 14:
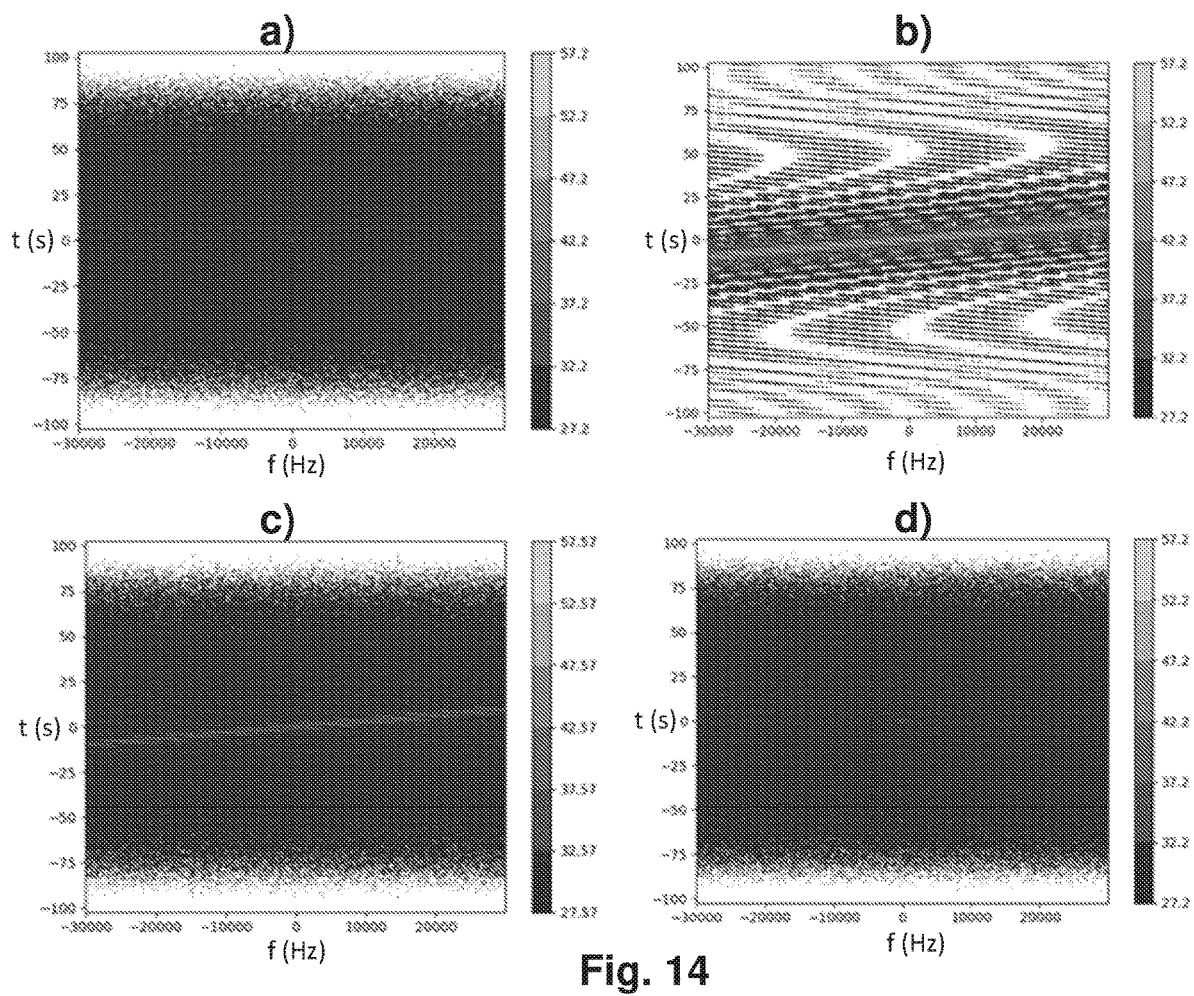

Part a) of FIG. 14 represents an example of an auto-ambiguity function of a useful signal transmitted by a transmitter device 10 of the radar system 90 according to the invention. Part b) of FIG. 14 represents the auto-ambiguity function of the "chirp" type parasitic signal. Part c) of FIG. 14 represents the ambiguity function calculated by an unauthorised receiver not belonging to the radar system 90 from a signal received after reflection by a target and a reference signal received directly from a transmitter device 10. Finally, part d) of FIG. 14 represents the ambiguity function calculated by a receiver device 20 belonging to the radar system 90 from a signal received after reflection by a target and from a memorised reference signal (as a reminder, the receiver device 20 knows the waveform of the useful signal and/or of the parasitic signal). In the example illustrated in FIG. 14, the parasitic signal has a power ten times less than the useful signal.

In an environment including interferences (ground clutter, parasitic direct signal, jamming, etc.), the power brought back by the secondary lobe of the ambiguity function will substantially deteriorate the detection sensitivity of a competing system. Indeed, the occupation in the frequency plane of the secondary lobes of the ambiguity function generated by the parasitic signal will mask the useful echoes in a significant portion of the spatial frequency/Doppler frequency plane.

It should be noted that the above-described elements for protecting the waveform of a useful signal transmitted by a transmitter device 10 of the radar system 90 according to the invention could be applied more widely for other radar systems, and in particular for radar systems whose transmitter devices are not necessarily on board satellites.

G) Control of the Radar System

To be operated efficiently, the radar system 90 according to the invention may require having different communication channels (preferably secure channels).

In particular, a communication channel between a transmitter device 10 and a receiver device 20 may be necessary to exchange information on the synchronisation, the illumination patterns, the ephemerides of the satellites carrying the transmitter devices, etc. For example, this communication channel can be implemented via a secondary modulation in the signal transmitted by the transmitter device 10 to the receiver device 20. According to another example, this communication channel may be implemented by an auxiliary satellite telecommunication network.

A communication channel between different receiver devices 20 may also be necessary to enable the construction of a detection metric based on measurements performed by several receiver devices. This communication channel may also allow sharing the view of the air situation specific to each receiver to cover the region of interest in an optimised manner.

A communication channel between a control station on the ground and the transmitter devices 10 and/or the receiver devices 20 may also be necessary to transmit any information relevant to the operation of the system (position of the transmitter devices, illumination sequence, synchronisation, results of the measurements performed by the receiver devices, etc.).

However, it should be noted that these communication channels are not always essential to the operation of the radar system 90 according to the invention to the extent that some information can be memorised a priori by a transmitter device 10 and/or by a receiver device 20.

In a particular embodiment, as illustrated in FIG. 15, the transmitter devices and/or the receiver devices 20 are configured to communicate via a satellite telecommunication network to exchange data between two transmitter devices 10, between two receiver devices 20, between a transmitter device 10 and a receiver device 20, between a control station 81 on the ground and a transmitter device 10, or between a control station 81 on the ground and a receiver device 20. In particular, the satellite telecommunication network includes the telecommunication satellites 80 and the control station 81 on the ground.

As illustrated in FIG. 15, the satellite telecommunication network allows, for example, establishing communication links 82 to send information from the control station 81 on the ground towards the transmitter devices 10 (for example information relating to the region of interest to be monitored, a command relating to the waveform to be generated, an illumination sequence to be performed, synchronisation information, etc.), communication links 83 to exchange information between the control station 81 on the ground and the receiver devices 20 (for example for sharing detection functions, measured observables, localised targets, etc.) and communication links 84 to send information from the transmitter devices 10 towards the receiver devices 20 (ephemerides, synchronisation, illumination sequence, etc.).

The architecture of the satellite telecommunication network may have different forms and different levels of centralisation (from a fully meshed architecture to a fully centralised architecture). A satellite telecommunication network is particularly well suited because it enables global coverage. Indeed, the links established between the telecommunication satellites 80 (ISL, standing for "Inter-Satellite Link") enable a data exchange between two entities very far apart from each other.

It should be noted that some functions described hereinabove with reference to FIG. 15 can be co-located. For example, a satellite 11 transporting a transmitter device 10 may also serve as a satellite 80 of the telecommunication network. Also, several control stations 81 on the ground may be involved to increase the overall resilience of the system. A control centre may collect information originating from the different receiver devices 20 and carry out the processing operations based on the collected information. This function could also be carried out by one of the receiver devices 20 or by a satellite 80 of the telecommunication network.

Figure 16:
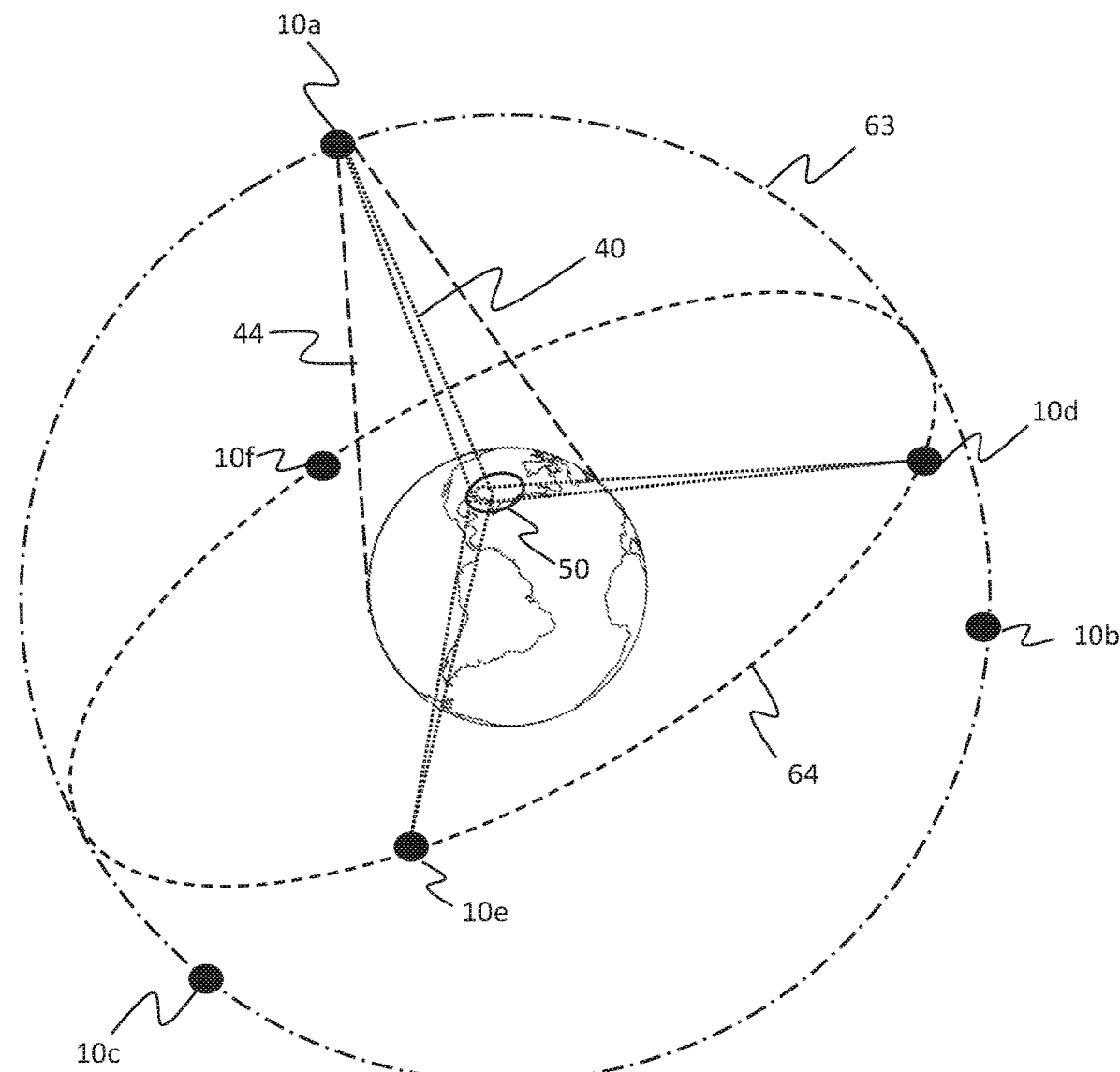
Figure 17:
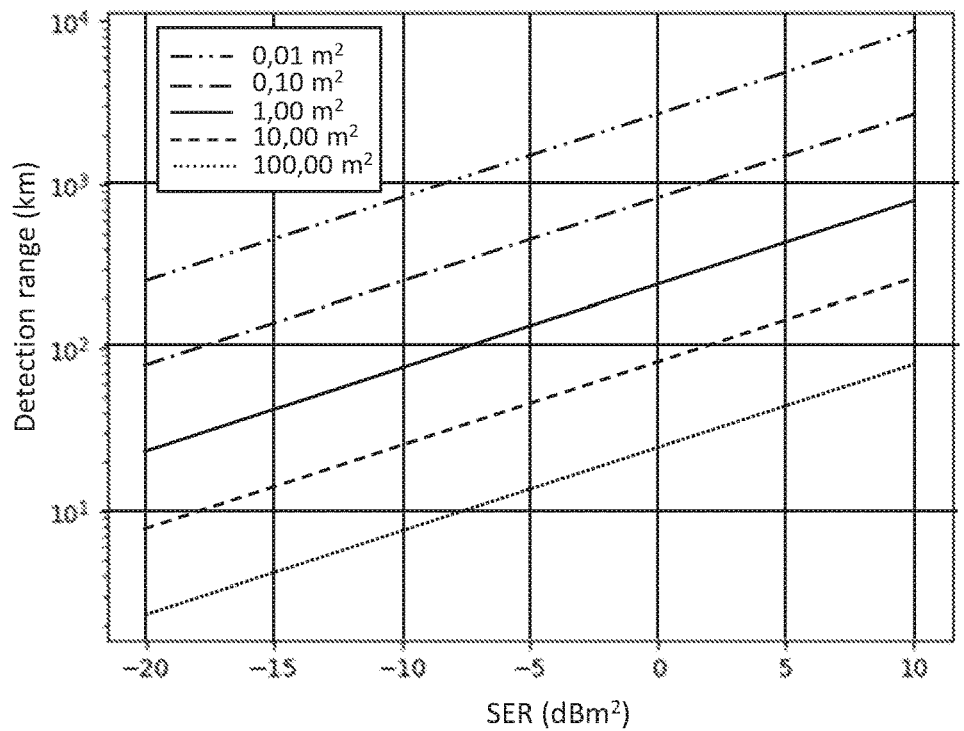

H) First Example with Transmitter Devices in MEO Constellation and Airborne Receiver Devices A first example of implementation of a radar system 90 according to the invention is illustrated in FIG. 16. This first example relates to a multi-static radar system 90 including six transmitter devices 10a to 10f on board satellites in medium orbit (or MEO, standing for "Medium Earth Orbit") at an altitude of 22,000 km and distributed over two orthogonal orbital planes 63, 64. On each orbital plane, the satellites are spaced apart from each other by an angle of 120° in order to enable a continuous illumination of any point on the Earth's surface. Three satellites carrying the transmitter devices 10a, 10b and 10c respectively are located in a first orbital plane 63. Three satellites carrying the transmitter devices 10d, 10e and 10f respectively are located in a second orbital plane 64. In FIG. 16, the cone 44 represents the area that can be illuminated on Earth by the satellite carrying the device 10a. In the example illustrated in FIG. 16, each of the transmitter devices 10a, 10d and 10e generates a radio beam to illuminate a portion of a region of interest 50 on the Earth's surface. Different beams can be generated successively to scan the entirety of the region of interest 50.

Of course, it is possible to consider a constellation including a greater number of satellites to increase the number of transmitter devices 10 and thus enable more frequent illumination of a sub-region of the region of interest 50, a longer integration time and/or a better detection sensitivity.

In this first example, the receiver devices 20 are on board airplanes (airborne receivers). The frequency band used by the radar system 90 is the X band (so-called supra-high frequency, or SHF, radio wave frequency range located around 10 GHz) to enable compatibility with airborne radars operating conventionally in this frequency band (for trade-offs between the size of the antenna, the capacity of the electronics, and the signal attenuations during propagation in the atmosphere).

In the considered example, a transmitter device 10 transmits a signal in the X band with a radio power in the range of 10 kW with an antenna with a twelve metre diameter whose reflector is capable of forming a radio beam at any point of the Earth. This type of antenna repointing is compatible with the use of a phased array in the focal plane of the reflector. It should be noted that in terms of antenna power and size, the characteristics of this antenna are very close to those of some telecommunication satellites. A transmitter device 10 forms a unique radio beam with a maximum equivalent isotropic radiated power (EIRP, standing for "Effective Isotropic Radiated Power") close to 100 dBW. The efficiency of the transmission antenna is about 65%. The −3 dB aperture of such an antenna is 0.18°. The footprint on the ground of a radio beam formed by the antenna then has a diameter in the range of about 58 km. Consequently, a region of interest with a 400 km diameter can be illuminated by forming about fifty successively illuminated beams following, for example, the illumination diagram illustrated in FIG. 3.

In the considered example, a receiver device 20 includes an antenna system with an aperture of 0.8 m² and a noise temperature of the system of 220 K.

The table hereinbelow summarises the parameters associated with the first example:

TABLE 1

| | |
|---|---|
| Frequency | 9.5 GHz |
| Altitude of the satellite carrying the transmitter device | 22,000 km |
| Antenna diameter of the transmitter device | 12 m |
| Antenna transmission gain | 59.7 dBi |
| Antenna efficiency | 0.65 |
| Diameter of the ground footprint of a radio beam | 57.9 km |
| Transmission power | 10 kW |
| Surface area of the antenna of the receiver device | 0.8 m² |
| Antenna reception gain | 38.2 dBi |
| (Radar Cross-Section) RCS of the target | 1 m² |
| Noise temperature of the receiver device | 220 K |
| Integration time | 0.2 s |
| Total losses (atmospheric attenuations, RF, processing of the signal, etc.) | 10 dB |
| Detection signal-to-noise ratio $SNR_R$ | 10 dB |
| Number of beams for illuminating a region of interest with a 400 km diameter | 50 |
| Revisit time | 10 s |
| Maximum detection range | 204 km |

Thus, it arises that it is possible to obtain a detection range of more than 200 km for targets with a 0 dBm² radar cross-section (RCS). These sensitivities can be improved by increasing the number of pairs formed by an association of a transmitter device with a receiver device (i.e. by increasing the number $N_E \cdot N_R$ of used bi-static configurations) in the calculation of the detection function.

Starting from these parameters, it is possible to determine other operating points for different target characteristics (different RCS values) and different sizes for the antenna of a receiver device. An illustration of different possible operating points is shown in FIG. 17.

I) Second Example with Transmitter Devices in MEO Constellation and Receiver Devices in LEO Constellation In a second example, the transmitter devices 10 are located on a constellation similar to that of the first example described with reference to FIG. 16, but the transmitter devices are located at a slightly lower altitude and have a slightly higher transmission power. In turn, the receivers are located on a constellation of satellites in low orbit at an altitude of 700 km (LEO orbit, standing for "Low Earth Orbit").

For this second example, the system operates in the L band around 1.3 GHz. In this case, the radio beam produced by a −3 dB aperture of an antenna of a transmitter device is enough to completely illuminate a region of interest with a 400 km diameter.

This allows avoiding having to resort to an illumination sequence and to be able to integrate the returns over longer integration times than in the previous example.

The receiver devices 20 in low orbit include an antenna with an area of 32 m² and a digital beam-forming network. It is assumed that the SER of the targets of interest will be higher in the L band than in the X band. The integration time for carrying out the processing is 2.5 seconds.

The table hereinbelow summarises the parameters associated with this second example:

TABLE 2

| | |
|---|---|
| Frequency | 1.3 GHz |
| Altitude of the satellite carrying the transmitter device | 20,700 km |
| Antenna diameter of the transmitter device | 12 m |
| Antenna transmission gain | 42.4 dBi |
| Antenna efficiency | 0.65 |
| Diameter of the ground footprint of a radio beam | 398.1 km |
| Transmission power | 12 kW |
| Surface area of the antenna of the receiver device | 32 m² |
| Antenna reception gain | 36.9 dBi |
| (Radar Cross-Section) RCS of the target | 3.2 m² (5 dBm²) |
| Noise temperature of the receiver device | 220 K |
| Integration time | 2.5 s |
| Total losses (atmospheric attenuations, RF, processing of the signal, etc.) | 10 dB |
| Detection signal-to-noise ratio $SNR_R$ | 10 dB |
| Number of beams for illuminating a region of interest with a 400 km diameter | 1 |
| Revisit time | 2.5 s |
| Maximum detection range | 1,240 km |
| Radius of the detection area projected on the ground | 1,025 km |
| Number of LEO satellites in reception for ensuring coverage at all points of the globe (25% swath overlap in average) | 200 |

Under these conditions, as summarised in the table hereinabove, the detection range of the LEO satellites is more than 1,240 km, which allows covering a detection area with a 1,025 km radius around the Nadir of the satellite. Assuming a constellation optimised to provide global coverage with an overlap rate of 25%, a constellation of 200 satellites could provide the receive portion of the system.

The description hereinabove clearly illustrates that, through its different features and their advantages, the present invention achieves the set objectives, namely providing a radar system for aerial surveillance allowing optimising the coverage, the detection range as well as the possibility of preventing unauthorised use of the signal transmitted by a transmitter.

It should be noted that the modes of implementation and embodiments considered hereinabove have been described as non-limiting examples, and that other variants could consequently be considered.

Beyond the disclosed examples, there are many other possible operating points for the proposed solution in terms of the orbits of the transmission satellites and the type of reception platform. Also, various operating points in terms of operating frequency could be considered in a frequency range varying between 0.1 and 100 GHZ with different constraints and opportunities on the transmission and reception chains and on the signal processing methods.

Figure 18:
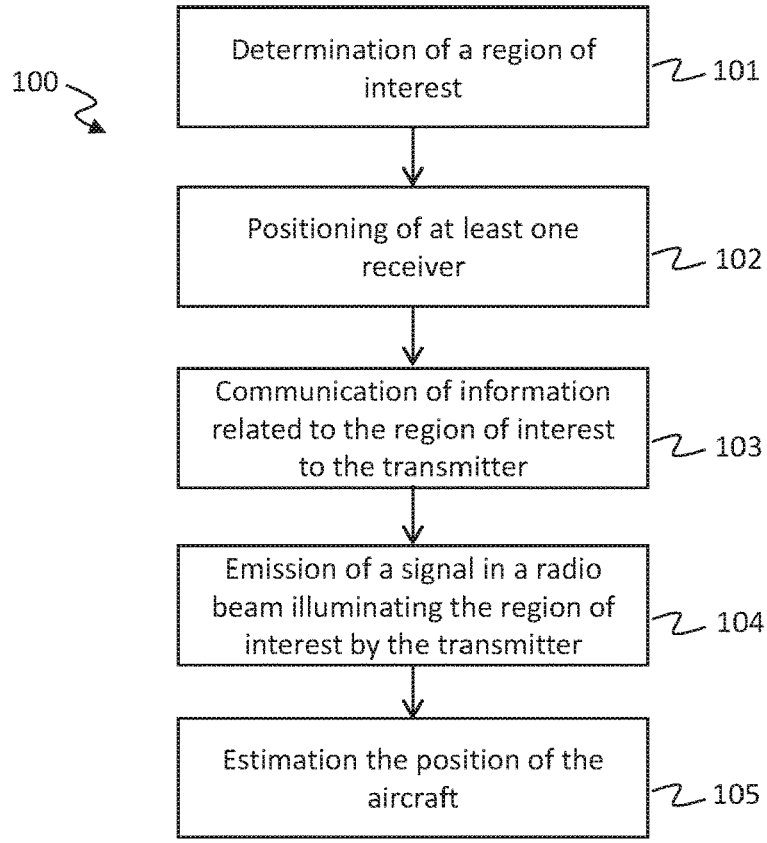

As illustrated in FIG. 18, the invention also relates to a method 100 for aerial surveillance using a bi-static or multi-static radar system 90. The radar system 90 includes at least one transmitter device 10 on board a satellite 11 orbiting the Earth and at least one receiver device 20. In particular, the method includes the following steps:
- a determination 101 of a region of interest 50 in which it is desired to detect and geolocate an aircraft 30,
- a positioning 102 of said receiver device 20 to monitor said region of interest 50,
- a communication 103 to the transmitter device 10 of information relating to said region of interest 50,
- an emission 104, by said transmitter device 10, of a signal in a radio beam 40 illuminating at least one portion of said region of interest 50,
- an estimation 105 of the position of the aircraft 30 in the region of interest based on a signal 41 received by the receiver device 20 corresponding to the reflection on the aircraft 30 of the signal transmitted by the transmitter device 10.

Of course, the different elements described before for the transmitter devices 10 and/or the receiver devices 20 of the radar system 90 according to the invention also apply to the method 100 in the form of additional optional steps (determination of an illumination sequence, combination of a parasitic signal with the useful signal to protect a signal transmitted by a transmitter device, use of transmission diversity and/or reception diversity to detect and geolocate a target, use of a satellite telecommunication network to exchange data between two transmitter devices, between two receiver devices, between a transmitter device and a receiver device, between a control station on the ground and a transmitter device, or between a control station on the ground and a receiver device, etc.).

The invention claimed is:

1. A transmitter device of an active bi-static or multi-static radar system for aerial surveillance, wherein the transmitter device is to be on board a satellite orbiting the Earth, the transmitter device is configured to cooperate with at least one receiver device, and when the transmitter device is on board the satellite in orbit, the transmitter device is configured to obtain information relating to a region of interest to be monitored by the at least one receiver device of the radar system and to transmit a signal in a radio beam illuminating at least a portion of the region of interest, wherein the transmitted signal is a combination of a useful signal with a parasitic signal, the parasitic signal being decorrelated from the useful signal and having an ambiguity function with a main lobe with a width in the frequency domain greater than twice the maximum Doppler frequency shift likely to be observed for a target aimed at by the radar system.

2. The radar system according to claim 1, wherein the parasitic signal is a "chirp" signal having a frequency varying linearly around a central frequency during a predetermined period with a random change in the central frequency from one period to another.

3. The radar system according to claim 2, wherein the bandwidth swept by the "chirp" signal during the predetermined period is greater than twice the maximum Doppler frequency shift likely to be observed for a target aimed at by the radar system.

4. A bi-static or multi-static radar system for aerial surveillance of a region of interest, the radar system aiming at geolocating an aircraft in the region of interest, the radar system comprising:
at least one transmitter device, wherein the transmitter device is to be on board a satellite orbiting the Earth, the transmitter device is configured to cooperate with at least one receiver device, and when the transmitter device is on board the satellite in orbit, the transmitter device is configured to obtain information relating to a region of interest to be monitored by the at least one receiver device of the radar system, wherein the radar system is a backward-scattering bistatic radar system, wherein the at least one receiver device is carried on mobile platforms, each transmitter device being configured to transmit a signal in a radio beam illuminating at least a portion of the region of interest,
the at least one receiver device to be positioned to monitor the region of interest.

5. The radar system according to claim 4, wherein the waveform of the transmitted signal is generated directly on board the satellite in a standalone manner.

6. The radar system according to claim 4, for which, when a radio beam transmitted by the transmitter device cannot completely illuminate the region of interest, the transmitter device is configured to successively illuminate different sub-regions of the region of interest.

7. The radar system according claim 4, further including a phased array antenna and a beam-forming network configured to repoint a radio beam transmitted by the transmitter device according to different directions.

8. The radar system according to claim 4, wherein the radar system includes several transmitter devices, wherein the several transmitter devices are on board satellites organised into constellations so that for any region of interest on the Earth's surface, there is always a direct line of sight towards said region of interest for several ones of said satellites.

9. The radar system according to claim 4, wherein at least one of the at least one transmitter device and the at least one receiver device is further configured to communicate via a satellite telecommunication network to exchange data for at least one of the following cases: communication between two transmitter devices, communication between two receiver devices, communication between a transmitter device and a receiver device, communication between a control station on the ground and a transmitter device, and communication between a control station on the ground and a receiver device.

10. A method for aerial surveillance using an active bi-static or multi-static radar system, the radar system including at least one transmitter device on board a satellite orbiting the Earth and at least one receiver device, the at least one transmitter device being configured to cooperate with the at least one receiver device, wherein the radar system is a backward-scattering bistatic radar system, wherein the at least one receiver device is carried on mobile platforms, wherein method includes:
- determining a region of interest in which it is desired to detect and geolocate an aircraft,
- positioning the at least one receiver device to monitor the region of interest,
- communicating to the at least one transmitter device information relating to the region of interest,
- transmitting, by the at least one transmitter device a signal in a radio beam illuminating at least a portion of the region of interest,
- estimating the position of the aircraft in the region of interest based on a signal received by the at least one receiver device, wherein the received signal corresponds to the reflection on the aircraft of the signal transmitted by the at least one transmitter device.

11. The method according to claim 10, wherein, when a radio beam transmitted by a transmitter device cannot completely illuminate the region of interest, the method further includes determining a sequence of illumination of different sub-regions of the region of interest for the at least one transmitter device.

12. The method according to claim 10, wherein transmitting the radio signal includes combining a parasitic signal with a useful signal, the parasitic signal being decorrelated from the useful signal and having an ambiguity function with a main lobe of a width in the frequency domain greater than twice the maximum Doppler frequency shift likely to be observed for a target aimed at by the radar system.

13. The method according to claim 10, wherein the radar system is a multi-static radar system including a number $N_E$ of transmitter devices and a number $N_R$ of receiver devices, where $N_E$ and $N_R$ are positive natural integers, wherein a number $N_E \cdot N_R$ ($N_E$ multiplied by $N_R$) of available bi-static configurations is greater than or equal to two.

14. The method according to claim 13, wherein the number $N_R$ of receiver devices is greater than or equal to two and wherein estimating the position of the aircraft includes measuring the time difference of arrival of the signal received by each receiver device.

15. The method according to claim 13, wherein the number $N_E$ of transmitter devices is greater than or equal to two and wherein estimating the position of the aircraft for a receiver device comprises determining at least two detection scores associated respectively with at least two transmitter devices, and the detection scores are projected into a common geometry and then cumulated.

16. The method according to claim 13, wherein a decision on the estimating the position of the aircraft is based on a combination of elementary decisions corresponding respectively to different bi-static configurations among the $N_E \cdot N_R$ available bi-static configurations.

17. The method according to claim 13, further including organizing the different satellites carrying the different transmitter devices into constellations such that, for any region of interest on the Earth's surface, there is always a direct line of sight towards said region of interest for several ones of said satellites.

18. The method according to claim 13, wherein a satellite telecommunication network also enables a data exchange for at least one the following cases: communication between two transmitter devices, communication between two receiver devices, communication between a transmitter device and a receiver device, communication between a control station on the ground and a transmitter device, and communication between a control station on the ground and a receiver device.

* * * * *